United States Patent
Slaby et al.

(10) Patent No.: US 10,715,519 B1
(45) Date of Patent: Jul. 14, 2020

(54) ADAPTIVE METHOD FOR BIOMETRICALLY CERTIFIED COMMUNICATION

(71) Applicant: Google Technology Holdings LLC, Mountain View, CA (US)

(72) Inventors: Jiri Slaby, Buffalo Grove, IL (US); Roger W. Ady, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 705 days.

(21) Appl. No.: 15/379,385

(22) Filed: Dec. 14, 2016

Related U.S. Application Data

(63) Continuation-in-part of application No. 14/108,573, filed on Dec. 17, 2013, now Pat. No. 9,553,859.

(60) Provisional application No. 61/863,741, filed on Aug. 8, 2013.

(51) Int. Cl.
*H04L 29/06* (2006.01)
*H04W 4/12* (2009.01)

(52) U.S. Cl.
CPC ........ *H04L 63/0861* (2013.01); *H04L 63/123* (2013.01); *H04W 4/12* (2013.01)

(58) Field of Classification Search
CPC ..... H04L 63/0807; H04L 63/123; H04W 4/12
USPC ............................................................ 726/7
See application file for complete search history.

(56) References Cited

U.S. PATENT DOCUMENTS

| | | | |
|---|---|---|---|
| 7,088,220 B2 * | 8/2006 | Kotzin | G07C 9/00142 340/5.82 |
| 8,099,598 B1 | 1/2012 | Liu | |
| 8,359,642 B1 | 1/2013 | Wurtenberger et al. | |
| 8,392,357 B1 | 3/2013 | Zou et al. | |
| 8,838,071 B1 * | 9/2014 | Cronin | G06F 3/0482 455/411 |
| 9,065,842 B2 | 6/2015 | Vandervort | |
| 2002/0059364 A1 | 5/2002 | Coulthard et al. | |
| 2002/0104026 A1 | 8/2002 | Barra et al. | |
| 2002/0116508 A1 | 8/2002 | Khan et al. | |
| 2003/0037261 A1 | 2/2003 | Meffert et al. | |
| 2003/0050898 A1 | 3/2003 | Oppat et al. | |

(Continued)

FOREIGN PATENT DOCUMENTS

| | | |
|---|---|---|
| WO | WO2002/023796 | 3/2002 |
| WO | WO-2005/112337 A1 | 11/2005 |

*Primary Examiner* — Matthew T Henning
(74) *Attorney, Agent, or Firm* — McDonnell Boehnen Hulbert & Berghoff LLP

(57) ABSTRACT

A communication device and method for authentication of a message being transmitted from the communication device. The method includes receiving, by a messaging utility, content of a message provided for transmission from the communication device. Based on a determination that the message requires user authentication before the message is transmitted to a recipient, the method further includes selecting, based on contextual data, one or more biometric capturing components of the communication device; triggering at least one selected biometric capturing component to capture a corresponding biometric input from a user of the communication device; and transmitting the message when the biometric input as belonging to an authorized user of the communication device. In one embodiment, a clearinghouse service authenticates a biometric input from a user of the communication device in order to certify the user and/or the message.

28 Claims, 13 Drawing Sheets

(56) References Cited

U.S. PATENT DOCUMENTS

| | | |
|---|---|---|
| 2003/0140235 A1 | 7/2003 | Immega et al. |
| 2003/0158960 A1 | 8/2003 | Engberg |
| 2004/0181581 A1 | 9/2004 | Kosco |
| 2005/0169274 A1 | 8/2005 | Shuster |
| 2005/0207614 A1 | 9/2005 | Schonberg et al. |
| 2005/0289079 A1 | 12/2005 | Krishan et al. |
| 2006/0015736 A1 | 1/2006 | Callas et al. |
| 2006/0123476 A1 | 6/2006 | Yaghmour |
| 2006/0294365 A1* | 12/2006 | Bae .................. H04L 63/08 713/155 |
| 2007/0094390 A1 | 4/2007 | Nussey |
| 2008/0086646 A1* | 4/2008 | Pizano .................. H04L 9/3231 713/189 |
| 2008/0141033 A1 | 6/2008 | Ginter et al. |
| 2009/0187759 A1 | 7/2009 | Marsico |
| 2009/0198997 A1 | 8/2009 | Yeap et al. |
| 2009/0234764 A1 | 9/2009 | Friesen |
| 2009/0327714 A1 | 12/2009 | Yaghmour |
| 2010/0005293 A1* | 1/2010 | Errico .................. G06F 21/32 713/165 |
| 2010/0211997 A1 | 8/2010 | McGeehan et al. |
| 2010/0299556 A1* | 11/2010 | Taylor .................. G06F 11/0757 714/6.12 |
| 2011/0191832 A1 | 8/2011 | Davis et al. |
| 2011/0283341 A1* | 11/2011 | Palekar .................. G06F 21/604 726/4 |
| 2011/0296489 A1* | 12/2011 | Fernandez Alonso ....................... H04L 63/08 726/1 |
| 2012/0036071 A1* | 2/2012 | Fulton .................... G06Q 20/10 705/44 |
| 2012/0110098 A1 | 5/2012 | Matsugashita |
| 2012/0124664 A1 | 5/2012 | Stein et al. |
| 2013/0067547 A1* | 3/2013 | Thavasi .................. G06F 21/31 726/7 |
| 2013/0074194 A1* | 3/2013 | White .................... H04L 51/24 726/28 |
| 2013/0074195 A1* | 3/2013 | Johnston ................ H04L 51/34 726/28 |
| 2014/0289833 A1* | 9/2014 | Briceno ................. H04L 63/08 726/7 |
| 2015/0046711 A1 | 2/2015 | Slaby et al. |
| 2015/0046996 A1 | 2/2015 | Slaby et al. |

* cited by examiner

ADAPTIVE METHOD FOR BIOMETRICALLY CERTIFIED COMMUNICATION

PRIORITY CLAIM

The present application is a continuation-in-part of U.S. patent application Ser. No. 14/108,573, entitled "ADAPTIVE METHOD FOR BIOMETRICALLY CERTIFIED COMMUNICATION," filed on Dec. 17, 2013, which claims priority from provisional application Ser. No. 61/863,741, entitled "ADAPTIVE METHOD FOR BIOMETRICALLY CERTIFIED COMMUNICATION," filed Aug. 8, 2013, which are commonly owned and are incorporated herein by reference in their entirety.

RELATED APPLICATIONS

The present application is further related to U.S. patent application Ser. No. 14/108,602, entitled "ADAPTIVE METHOD FOR BIOMETRICALLY CERTIFIED COMMUNICATION," filed Dec. 17, 2013, which is incorporated herein by reference in its entirety.

BACKGROUND

1. Technical Field

The present disclosure generally relates to electronic communication devices and in particular to message authentication and transmission from electronic communication devices. Sill more particularly, the present disclosure relates to message authentication and transmission from a communication device that is configured with mechanisms for capturing biometric input.

2. Description of the Related Art

Personal electronic devices such as smart phones are becoming ubiquitous, as the devices provide a source of entertainment, communication, navigation, and personal assistance. Today's devices can have a number of biometrics technologies, such as imager, fingerprint sensor, voice detection, etc., that are embedded in the devices and which are used for user identification. Often, these personal electronic devices are utilized to generate and communicate messages, such as emails and/or text message, from the device to a recipient. It is expected that these messages would normally be created and/or transmitted by the owner or an authorized user of the device. However; this scenario is not always the case as these devices can occasionally be (i) borrowed by a friend or family member, (ii) lost or stolen, or (iii) subject to third party hacking. In such instances, message generation and transmission is not by the owner or an authorized user, and any type of content can be included in messages that are generated and/or transmitted from the device. Presently, other than simply locking the device from use altogether, there is no way for an authorized user to prevent message generation and transmission with content that the authorized user may not approve of or which would not be normal message content that the user would send.

Additionally, as a surrogate for face-to-face interactions, digital personas and social media are playing an increasingly significant role in prompting and facilitating one's personal and professional interactions. Human nature and history suggests that with this trend comes an increasing risk of deception, criminal activity, and other abuses that digital interactions are particularly vulnerable to. People need a way to validate that the individuals they are interacting with in certain types of interactions are who they say they are.

Additionally, in the social media context, certified contextual information accompanying the communication can afford the recipient an opportunity to do "natural" identity validation. The contextual information can be similar to social media in that users are able to validate identity just by the nature of the personal dialog and references that accrue to their pages, all of which would be challenging to fake convincingly. However, such contextual information is not generally available in other modes of communication and other interaction domains.

BRIEF DESCRIPTION OF TILE DRAWINGS

The disclosure will best be understood by reference to the following detailed description of illustrative embodiments when read in conjunction with the accompanying drawings, wherein.

DETAILED DESCRIPTION

Figure 1:
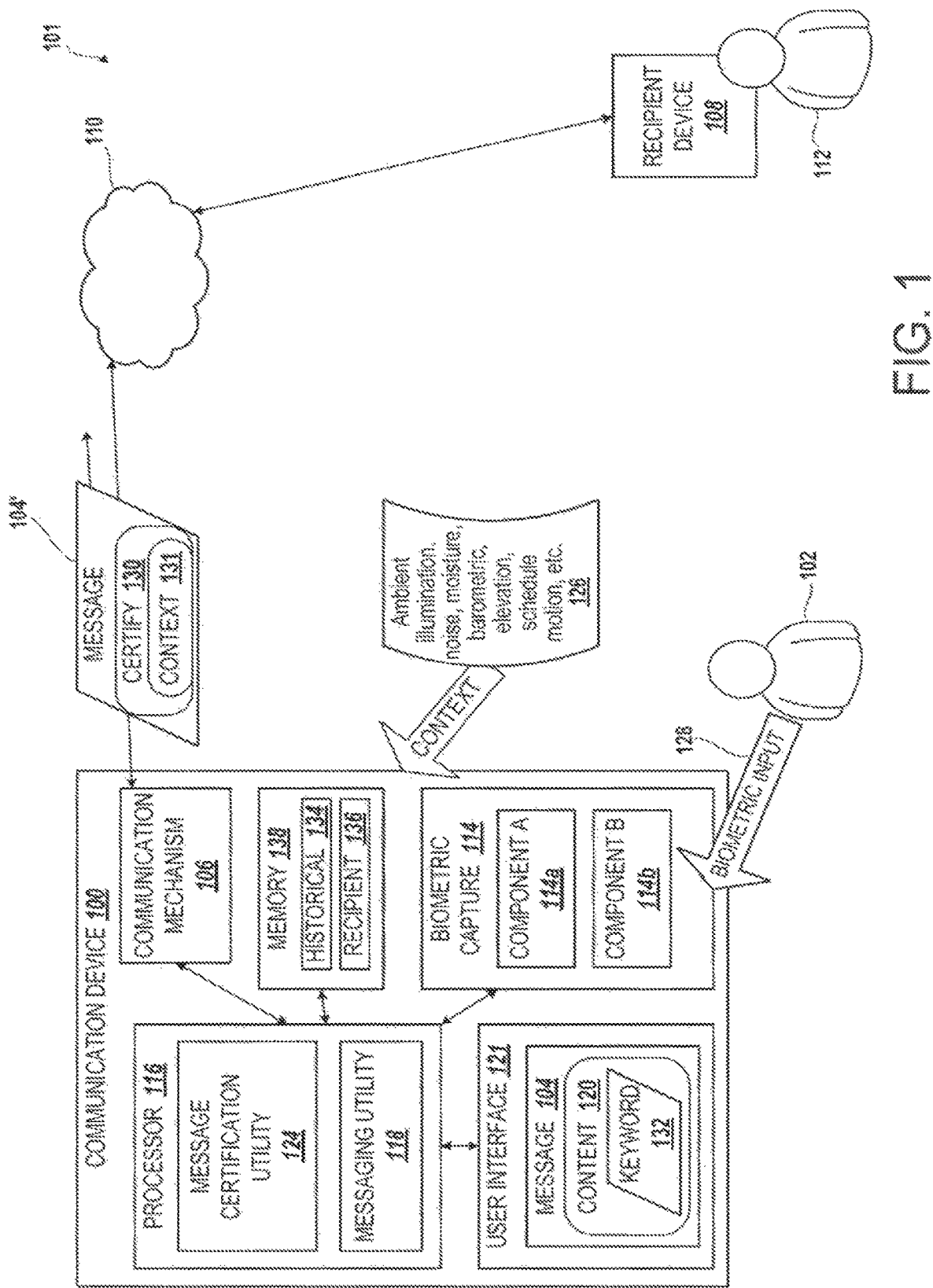
FIG. 1 is a block diagram of an example communication device that biometrically certifies messages, according to one embodiment.

The illustrative embodiments of the present disclosure provide a method and communication device that enables biometric user authentication of a message. According to one aspect, the communication device includes: a communication mechanism that enables communicating with a network, at least one biometric capturing component, and at least one processor that is communicatively coupled to the communication mechanism and to the at least one biometric capturing component. A messaging utility executes on the at least one processor and configures the communication device to accept message content intended for transmission to a recipient communication device. A message certification utility executes on the at least one processor. Based on a determination that the message requires user authentication before the message is transmitted to the recipient device, the message certification utility configures the communication device to: select, based on message content or contextual data, one or more biometric capturing components of the communication device; trigger at least one selected biometric capturing component to capture a corresponding biometric input from a user of the communication device; and transmit the message when the biometric input is authenticated as belonging to an authorized user of the communication device.

In at least one embodiment, the message certification utility selects the most appropriate biometric solution, based on the message content and the situational circumstances associated with the device (i.e., context data), in order to optimize device operation and the user's experience. The user is advised of the most appropriate biometric identification method and is able to provide the requested biometric identification in order to assure proper communication security. No message is transmitted in the event the user is unable to provide the requested biometric identification for authentication.

In an alternate embodiment, a clearinghouse performs user authentication and certification of user's identity for a message being transmitted from a communication device to a recipient device. According to one aspect, the clearinghouse receives a biometric input from a communication device and compares the received biometric input against clearinghouse biometric verification input/s or codes of registered users in order to identify and authenticate a user of the communication device. In response to identifying and authenticating the user, the clearinghouse generates and transmits a certification token to the communication device for inclusion in the message being transmitted by the communication device to the recipient device.

In at least one embodiment, a clearinghouse server has a communication interface that enables communication with a communication device that generates messages for transmission to a recipient device. The clearinghouse server also has a network interface by which the clearing house server communicates with an authoritative source that provides unique identifying information about one or more users. A processor is coupled to the communication interface and the network interface. A storage device is coupled to the processor and includes a certifying utility that executes on the processor to configure the clearinghouse server to: receive a biometric input from a communication device; compare the received biometric input against clearinghouse biometric verification input's of registered users in order to identify and authenticate or certify a user of the communication device; and in response to identifying and authenticating the user, generate and transmit a certification token to the communication device for inclusion in the message being transmitted by the communication device to the recipient device. The comparison of the received biometric input against clearinghouse biometric verification input's of registered users may also be a one-on-one comparison of a known user against a stored template or code. If no match is found, then the user can be deemed as not authenticated.

As a preface to the disclosure, user authentication based on passwords and biometrics, such as fingerprints, is rapidly becoming a standard practice on handheld and wearable devices, Generally, the authentication is used to secure the content and access privileges of the devices themselves. One aspect of the present disclosure involves extending this authentication capability to provide a level of identity verification for users engaged in social or business interactions across a wide variety of digital domains. Those interactions do not necessarily need to be conducted through the authenticating device either as long the authenticating device is part of an ecosystem of devices and applications associated with the user. The recipient of the communication can rely upon a trusted automated authenticator of the originating user, either on an originating user device or at a remote clearinghouse.

Several different approaches for verification and/or authentication are described within the disclosure, including systems where with the user's permission, a third party verifies the user's identity through a credit reporting agency, government database, credit card company, or other service that crosschecks identities, then associates that identity in a secure fashion with the user's biometric or password data. The user's identity data can then be shared selectively, with various counter-parties during—or as a preface to—a digital exchange. The user would authenticate on the device at the time of the interchange and an authentication code would be sent to the counter party as part of the interchange, such that upon viewing the interchange within a specified time interval the counter-party is provided with identity data on the original party, for instance the person's name and/or home city of residence.

As one aspect, the disclosure involves establishing the user's identity through an authoritative source such as banking or government channels and then managing the identity and biometric data to allow future crosschecking. The disclosure also provides for simpler routines that provide a lesser level of identity assurance that may be appropriate for certain types of communication. These simpler routines can include embedding a short video or embedding Global Positioning System (GPS) location data into the correspondence bitstream that can then be decrypted and viewed by the recipient. The various solutions described herein are presented as alternate measures that can be independently applied or can be combined, with the end goal being to prevent or significantly curtail blatant spoofing by individuals claiming to be somewhere or be someone that is inconsistent with their current location, looks, or voice, or other biometrically verifiable characteristics.

Further to the descriptions above, a user may be provided with controls allowing the user to make an election as to both if and when systems, programs or features described herein may enable collection of user information (e.g., biometric information, information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the following detailed description, exemplary embodiments in which various aspects of the disclosure may be practiced are described in sufficient detail to enable those skilled in the art to practice the invention. It is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Turning now to FIG. 1, there is depicted a block diagram representation of an example communication device 100 within which several of the features of the disclosure can be implemented. According to the general illustration, the communication device 100 is a processing device of a user 102 who originates a message 104 that is to be transmitted by a communication mechanism 106 to another communication device (recipient device 108) via a network 110 in a communication system 101. For example, the message can be an email, an audio recording, a multimedia message service (MMS) message, a short message service (SMS) message, or other type of transmittable message. A user 112 of the recipient device 108 is the recipient of the message 104'. The communication device 100 includes at least one biometric capturing component 114, which for clarity is depicted as a first biometric capturing component "A" 114a and a second biometric capturing component "B" 114b. At least one processor 116 is communicatively coupled to the communication mechanism 106 and to the at least one biometric capturing component 114. A messaging utility 118 executes on the at least one processor 116 and configures the communication device 100 to receive content 120 of a message 104 via a user interface device 121 of the communication device 100.

According to one or more embodiments, a message certification utility 124 executes on the processor 116. Based on a determination that the message 104 requires user authentication before it is transmitted to a recipient (user 112), message certification utility selects, based on content of the message or contextual data (not shown), one or more biometric capturing components 114 of the communication device 100; triggers at least one selected biometric capturing component 114 to capture a corresponding biometric input 128 from a user 102 of the communication device 100; and transmits an authenticated message 104' in response to authenticating the biometric input 128 as belonging to the user 102 which is authorized for the communication device 100.

According to one embodiment, the message certification utility 124 can configure the communication device 100 to select the biometric capturing component 114 based on the contextual data 126 that can include one or more ambient conditions that indicates which biometric capturing device is best for the condition and/or whether a particular biometrical capturing device is ineffective given the specific ambient condition. Examples of the ambient conditions can include: (i) moisture; (ii) an ambient illumination; (iii) an obstructed sensor; (iv) an activity associated with motion of the communication device; (v) a barometric pressure; and (vi) ambient noise.

In at least one exemplary implementation, the authenticated message 104' can include a certification 130 that conveys to the recipient (user 112 of recipient device 108) that the message 104' was authenticated. Alternatively or in addition, the certification 130 incorporates the biometric input 128 as contextual information 131 into the message 104' to bolster confidence in the authentication. In one embodiment, the certification 130 can provide an indication that the contextual information 131 was automatically incorporated without manipulation by the user 102 with the contextual information 131 enabling the recipient (user 112) to confirm the authentication.

Figure 2:
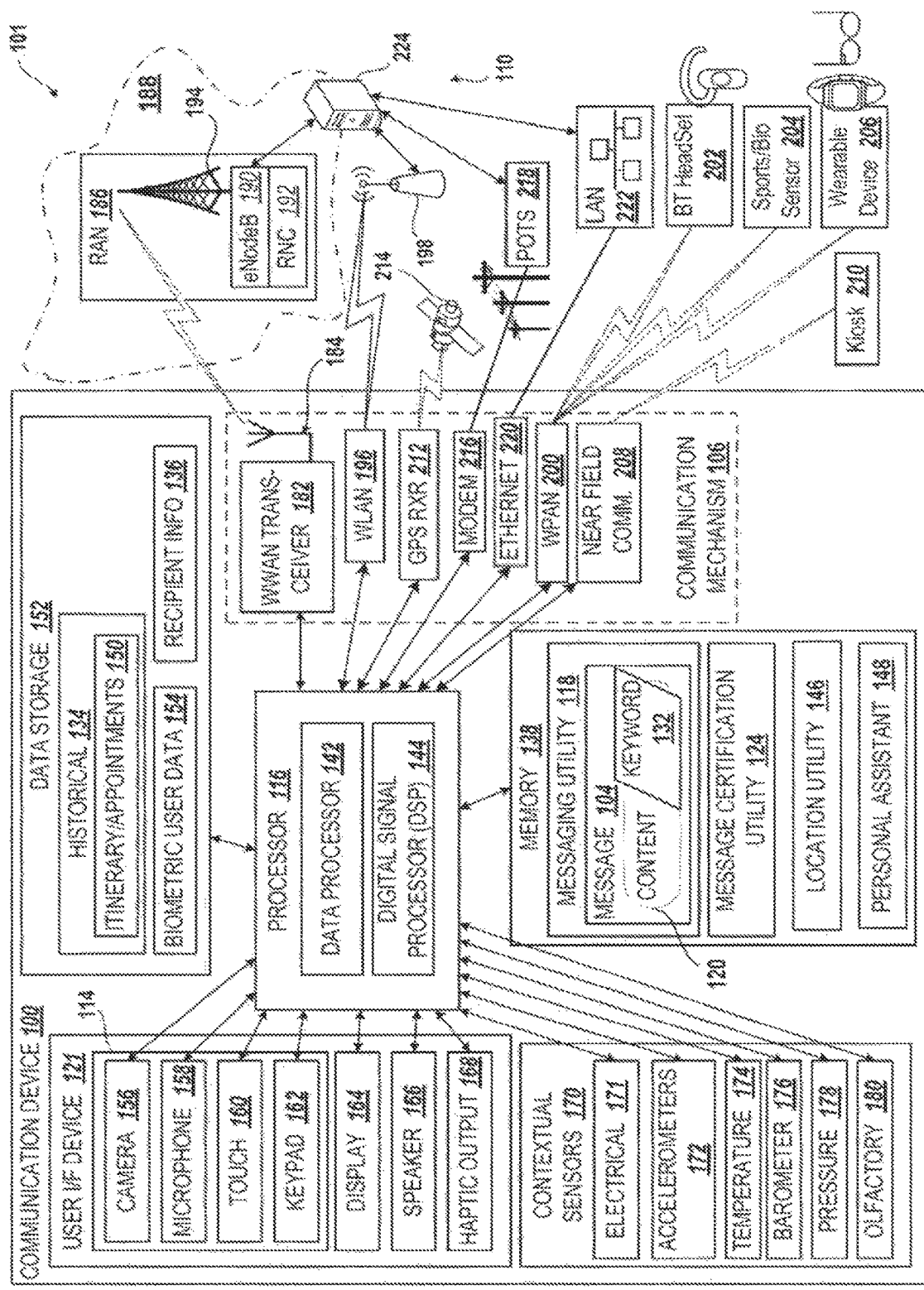
FIG. 2 is a detailed block diagram of the example communication device of FIG. 1, according to at least one embodiment.

Referring now to FIG. 2, the component makeup and the associated functionality of the presented components are shown. Communication device 100 can include an integrated circuit (IC) processor 116, which connects via a plurality of bus interconnects (illustrated by the bi-directional arrows) to a plurality of functional components of communication device 100. The communication device 100 can be one of a host of different types of devices that interact with users, including but not limited to, a mobile cellular phone or smart-phone, a cordless phone, a desktop computer, a laptop, a net-book, an ultra-book, a networked sports/exercise watch, and/or a tablet computing device. The various devices provide and/or include the necessary hardware and software to support the various wireless or wired communication functions as part of a communication system 101.

Processor 116 can include one or more programmable microprocessors, such as a data processor 142 and a digital signal processor (DSP) 144, which may both be integrated into a single processing device, in some embodiments. The processor 116 controls the communication, user interface, and other functions and/or operations of communication device 100. These functions and/or operations thus include, but are not limited to, application data processing and signal processing. The present innovation can be implemented using hardware component equivalents such as special purpose hardware, dedicated processors, general purpose computers, microprocessor based computers, micro-controllers, optical computers, analog computers, dedicated processors and/or dedicated hard wired logic. Connected to processor 116 is memory 138, which can include volatile memory and/or non-volatile memory.

Figure 5A:
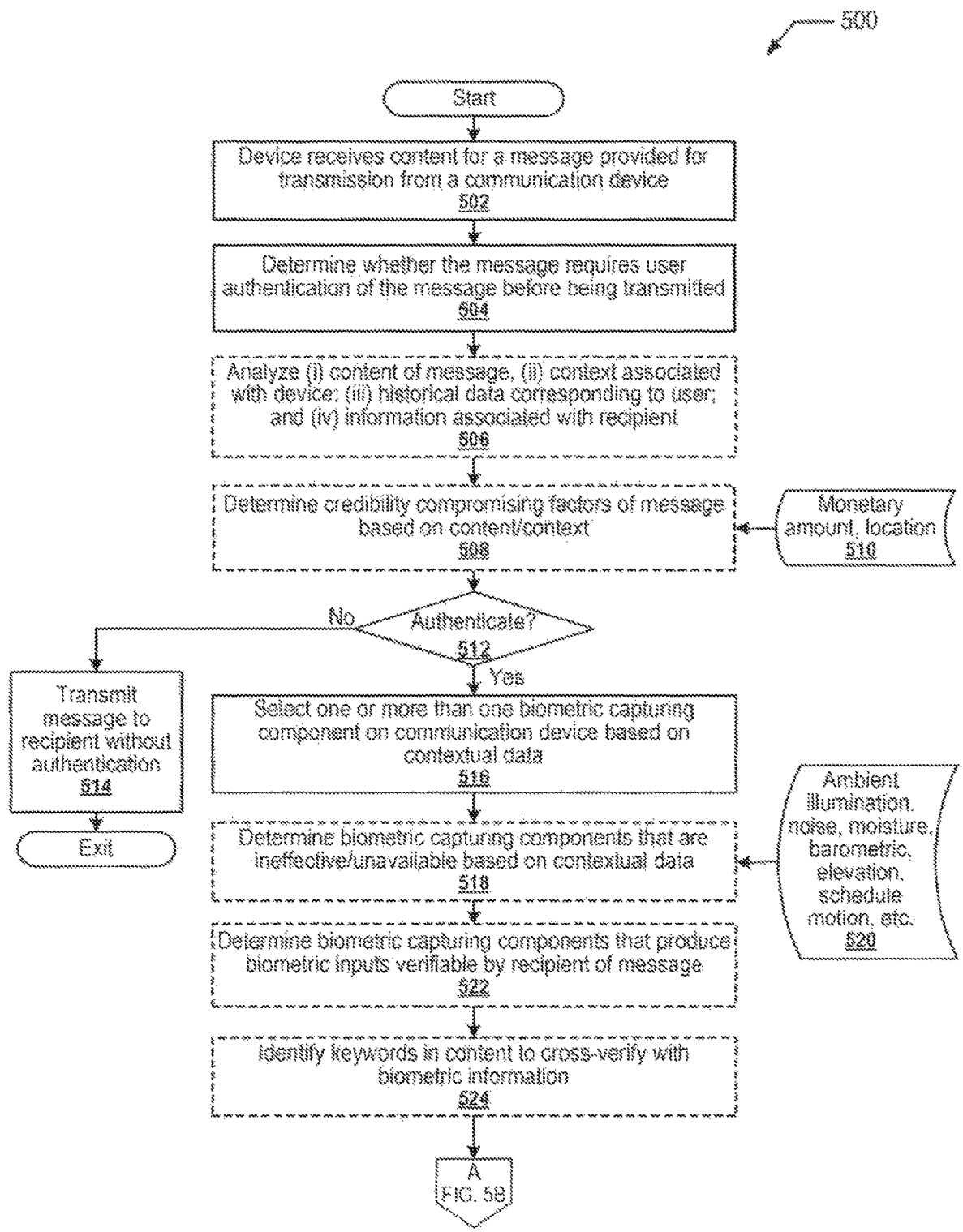
FIG. 5 (A-B) is a flow chart of a method for biometrically certifying a message transmitted by a communication device, according to one embodiment.

One or more executable applications can be stored within memory 138 for execution by data processor 142 on processor 116. For example, memory 138 is illustrated as containing a messaging utility 118 and a message certification utility 124. In at least the illustrated embodiment, memory 138 also contains a location utility 146 for determining contextual data 126 for location. The associated functionality and/or usage of each of the software modules will be described in greater detail within the descriptions which follow. In particular, the functionality associated with message certification utility 124 is described in greater detail with the description of the flow charts of FIGS. 5A-5B, and other figures. The memory 138 can also contain a personal assistant utility 148 for user interaction with historical data 134, such as itinerary and appointments data 150 stored in a data storage device 152 along with biometric user data 154 and recipient information 136. The data storage device 152 that is also coupled to processor 116 can be any type of available storage device that is integral, attachable or insertable and capable of storing one or more application software and data. It is further appreciated that in one or more alternate embodiments, the data storage device 152 can actually be remote storage and not an integral part of the communication device 100 itself. The specific usage and/or functionality associated with these components are described in greater detail in the following descriptions.

With reference to FIGS. 1-2, according to one or more embodiments, the message certification utility 124 can determine that the message requires user authentication based on at least one of: (i) the content 120 of the message, such as keyword 132, (ii) a context (contextual data 126) associated with the communication device, (iii) historical data 134 corresponding to a user associated with the communication device and/or with previous message content approved for transmission from the communication device, and (iv) recipient information 136 associated with a recipient of the message. For example, the historical data 134 and the recipient information 136 can be stored in memory 138 as illustrated in FIG. 1 or in the data storage device 152 as illustrated in FIG. 2.

With particular reference to FIG. 2, communication device 100 also includes the user interface device 121 having one or more input devices, such as camera 156, microphone 158, touch screen and/or touch pad 160, and keypad 162. The touch screen and/or touch pad 160 can further include a fingerprint sensor or this can be a discrete component. The user interface device 121 can also have one or more output devices, such as display 164, speaker 166, and haptic output device 168. The input devices can serve as biometric capturing components 114. For example, the camera 156 can perform face recognition, or iris, or eye veins, or retina, or their combination. Additionally, key points relative to one another can be matched as well as correlated with color data. For another example, the microphone 158 can perform voice recognition. In addition, the user can enter a key code via the touch screen or touch pad 160, keypad 162, or microphone 158. These inputs can be received in response to a user prompt or can be accomplished in the background, such as by an always-on voice capability or an always-on camera capability.

The communication device 100 includes at least one contextual sensor 170, such as an electrical sensor 171 that detect physiological signals, accelerometers 172 to detect motion, a temperature sensor 174, barometer 176, pressure (grip) sensor 178, and olfactory (smell) sensor 180, or GPS.

The communication mechanism 106 can support one or more modes of communication in order to transmit the message 104. To support wireless communication, communication device 100 can include one or more communication components, including wireless wide area network (WWAN) transceiver 182 with connected antenna 184 to communicate with a radio access network (RAN) 186 of a cellular network 188. The RAN 186 is generally represented as including a base station, depicted as an evolved base node ("eNodeB") 190 controlled by a radio network controller (RNC) 192 that transceives over a base station antenna 194. For clarity, one connected antenna 184 of the communication device 100 is depicted. However, the communication device 100 may contain more than one antenna, each antenna having one or more selected bandwidths of operation to support different modes of communication or for simultaneous communication in different communication technologies.

Alternatively, or in addition to a WWAN transceiver 182, communication device 100 can include a wireless local access network (WLAN) module 196 to communicate with wireless devices and network, depicted as a wireless access point 198. As an example, the WLAN module 196 may support IEEE 802.11 standards as a WiFi hotspot. Alternatively or in addition, the communication device 100 can include a wireless personal access network (WPAN) transceiver 200 for communication with WPAN devices, depicted as a Bluetooth® headset 202, a sports/biometric/physiological sensor 204, and a wearable device 206 (multi-function watch, heads up display, etc.). WPAN can include technologies such as Infrared Data Association (IrDA) standard, Wireless Universal Serial Bus (USB), Bluetooth®, Z-Wave, ZigBee, Body Area Network, and ANT+. Alternatively or in addition, the communication device 100 can include a near field communication (NFC) transceiver module 208, such as can be utilized for exchanging files with another user device or a payment kiosk 210. One or more of these WPAN devices can provide contextual data such as by relaying ambient conditions sensed by another device.

A global positioning system (GPS) receiver (RXR) 212 of the communication mechanism 106 can receive signals from GPS satellites 214 in order to provide location as contextual data. Alternatively or in addition to GPS, the communication mechanism 106 can provide a location service by triangulating from one or more RANs 186. Alternatively or in addition, location service by the location utility 146 can be provided by "sniffing" small coverage area cells such as one or more wireless access points, femtocells, relays, etc. As further illustrated, communication device 100 can also include components for wired communication, such as modem 216 for communicating over a plain old telephone system (POTS) 218 and Ethernet module 220 for connecting to a local access network (LAN) 222.

Certain functions described herein can be performed remote from the communication device 100 over the network 110. For example, voice or image recognition functions can require processing capabilities or access to stored samples and characterizations of authorized users that are performed by one or more networked devices, depicted as network server 224. In the illustrative depicted, the network server 224 is connected to the cellular network 188, wireless access point 198, POTS 218, LAN 222, and WLAN. However, it should be appreciated that such distributed processing can be accessed over one or other combinations of access networks.

Figure 3:
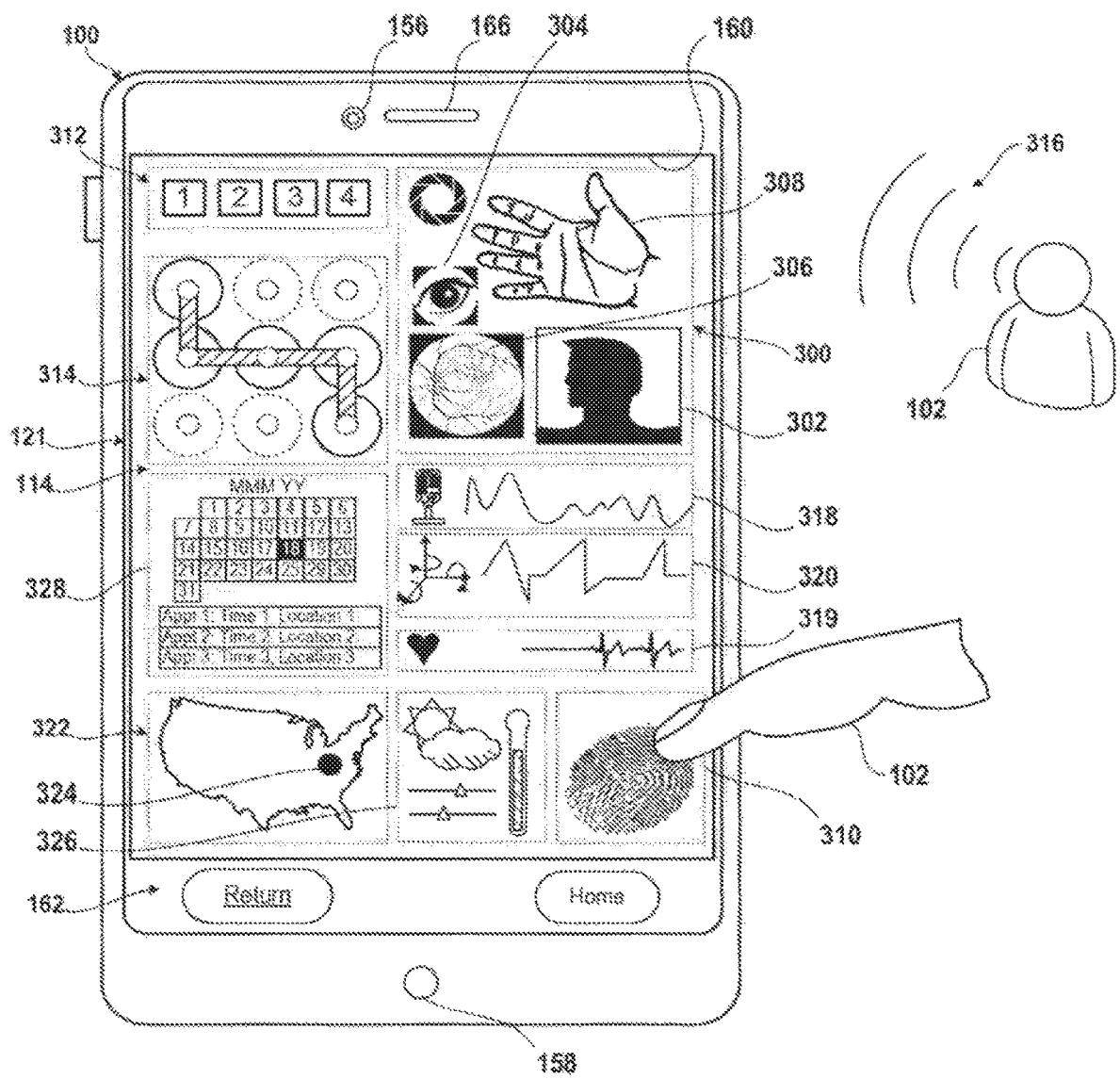
FIG. 3 illustrates an example user interface of the communication device of FIG. 1 having more than one biometric certification component, according to at least one embodiment.

FIG. 3 illustrates an example communication device 100 that can select among multiple biometric capturing components 114 based upon contextual data. For example, the more than one biometric capturing components 114 can include a visual pattern recognition component 300, such as a camera 156 that can image a face 302, an eye (iris/blood vessels in the whites of the eye) 304, a retina 306, or a palm 308. Further, it may also utilize IR light in conjunction w/ imager for palm vein or finger vein recognition. As another example, one or more of a touch screen or touch pad 160, the camera 156, or finger scanner (not shown) can capture a fingerprint 310. The camera 156 can also detect contextual data such as being obscured by clothing or otherwise encased. As yet another example, an ambient light sensor (not shown), proximity detector (not shown), accelerometers 172 (FIG. 2) or gyroscopic inertial platform (not shown) can detect characteristics of being in a pocket. The user interface 121 can receive tactile inputs as biometric inputs depicted as a password or Personal Identification Number (PIN) 312 and a touch pattern 314. In one or more embodiments, the microphone 158 receives audio 316 in order to perform voice recognition 318 or to accept an audible version of the PIN 312. Alternatively or in addition, the electrical sensor 171 (FIG. 2) can detect a heart signature 319. As another example, when the communication device 100 is placed close to the ear of the user 102, visual or infrared (IR) imaging of the ear can yield biometric inputs.

The example communication device 100 also depicts contextual data upon which a selection of an appropriate biometric capturing component 114 can be based. The contextual data can also provide a basis for determining a requirement to authenticate the message. In certain embodiments, the communication device 100 can access the accelerometers 172 to detect motion indicative of user activity as depicted at graph 320. Gait detection can be different based upon the environment. For example, tremble detection imparted by holding the communication device 100 can convey contextual information about the activity. A location service depiction 322 illustrates a current location 324 of the communication device 100. A weather tracking utility 326 either receives local weather based upon current location 324 or senses the weather directly in the ambient environment (e.g., barometric pressure, temperature, moisture, relative humidity, etc.). Historical data, which can include appointment calendar 328, can be used in comparison to location or other data to determine a context. The historical data also includes user patterns, routes, and typical times of those.

Figure 4:
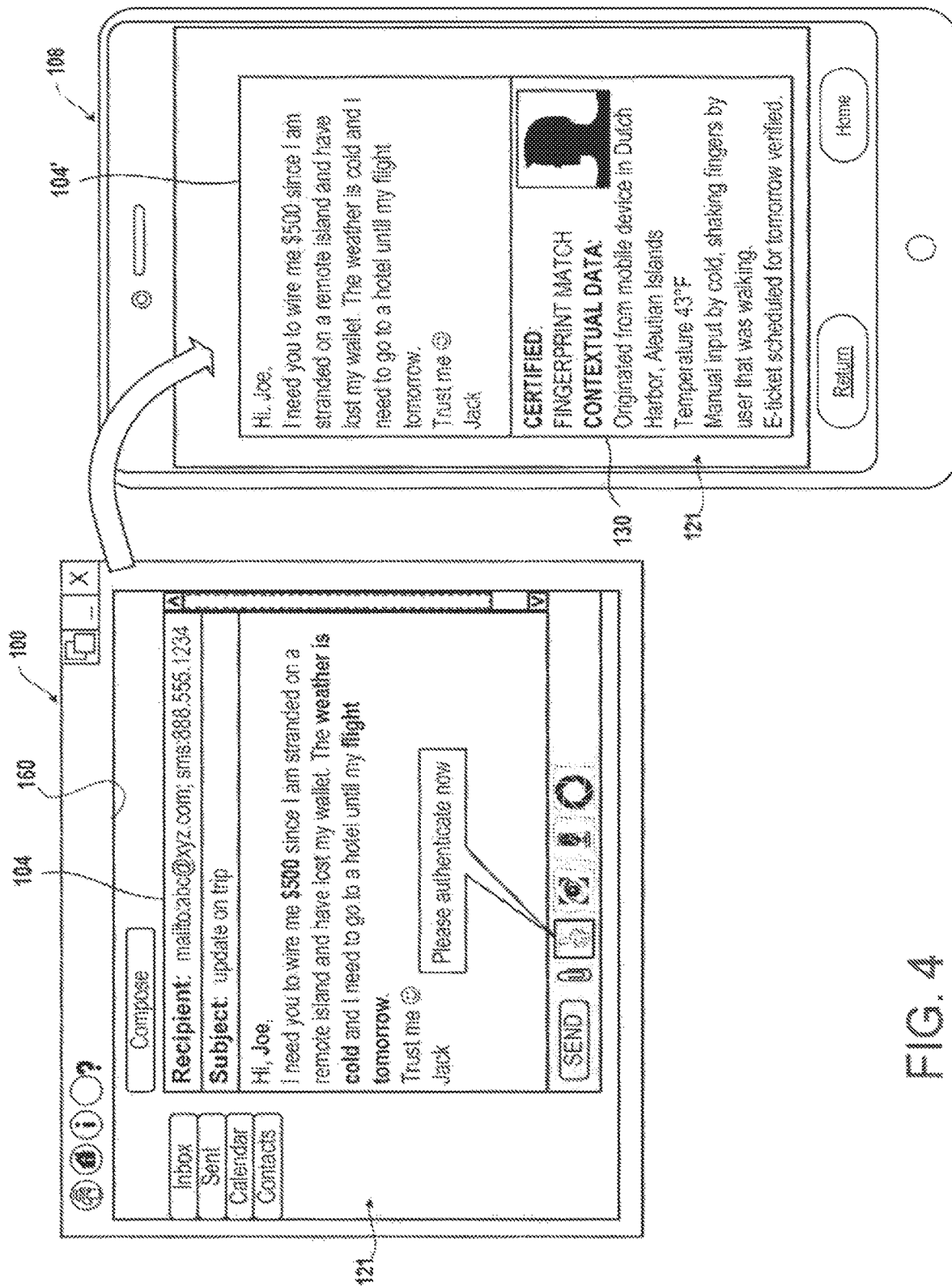
FIG. 4 illustrates depictions of communication devices displaying a biometrically certified message, according to one embodiment.

FIG. 4 illustrates an example message 104 as provided on the user interface 121 of the communication device 100 during message origination and prior to message authentication. FIG. 4 also depicts an authenticated message 104' as displayed on recipient device 108. According to one or more embodiments, several content related items and/or contextual situations can trigger the need for authentication. The content-related trigger can be based on a keyword search of message contents for specific content, such as a request for the intended recipient to send money above a threshold amount and information associated with a recipient of the message.

The contextual situations can include contextual data associated with the communication device 100, such as the location of the device, the ambient weather conditions surrounding the device, and others. In response to a determination that authentication is required, the communication device 100 can automatically capture biometric input of the user of the communication device 100 without the user's assistance. For example, the communication device 100 can perform facial recognition based upon the user's face being within the focal plane of the camera lens 156 (FIG. 3). For another example, the communication device 100 can perform voice recognition based upon a spoken input by the user 102. In situations where user cooperation is required to obtain a biometric input, a notification is generated to prompt the user to provide the biometric input that is selected as appropriate based upon contextual data. For example, a fingerprint scanner can require a particular technique of swiping a finger across a linear surface. Such action does not ordinarily occur without user cooperation.

In certain situations, the communication device 100 can proactively determine, based upon contextual data, that a particular biometric input cannot be automatically obtained and that prompting the user will not allow for the particular biometric input to be effectively obtained. For example, ambient conditions can preclude the efficacy of certain biometric inputs and the selection of a different biometric input is desired. For example, a touch screen or touch pad 160 can rely upon a capacitive characteristic of the user's hand that is detectable in dry ambient conditions, but which capacitive characteristic would not be detectable in moist ambient conditions. As another example, contextual data can relate to physiological or movement data indicating that the user 102 is engaged in an activity that makes it inconvenient or unsafe for the user to provide a particular biometric input. If the communication device detects that the user 102 is driving, for example, the communication device would preclude hands-on inputs or facial recognition input as the authentication methods. Thus, in one embodiment, the selection of a specific biometric capturing component 114 can consider what is efficacious.

The recipient may not be able to discern the credibility of the message from its unauthenticated and uncorroborated contents alone. In fact, the contents can create doubt of authenticity. For example, the fact that a co-worker makes a plea for money from an exotic location can actually be truthful even though such messages are frequently scams. In at least one embodiment, the recipient can be aware in advance that the sender's communication device 100 determines whether authentication is required, and that the sender's communication device 100 transmits in such an instance only after one or more biometric inputs have been authenticated. Thus, receiving the authenticated message 104' on the recipient device 108 can be evidence of authentication. However, in many communication systems 101, spoof messages can be received along with authenticated messages 104' so a higher degree of credibility is desired. To that end, the certification 130 that accompanies the authenticated message 104' can convey confidence in the authentication. Alternatively, the certification 130 can include the biometric input or the contextual data that allows a recipient to also validate the authenticated message 104'. Also include map of location in the message.

FIG. 5 (A and B) illustrates a method 500 for enabling biometric user authentication of a message, and in particular to selecting appropriate biometric input(s) based on a context of a communication device. According to one or more embodiments, method 500 further illustrates selecting one or more biometric capturing components on the communication device to authenticate a message as originating from an authorized user based at least in part on contextual data. Within the flow charts, certain blocks provide processes that are considered optional, in some embodiments. These optional blocks are identified with dashed lines rather than the solid exterior lines provided for the remaining blocks. At block 502, the messaging utility receives content of a message for transmission to another communication device. For example, the user indicates that the particular message is ready to be sent by selecting a "SEND" control. The message can be a new message generated by the user, an existing message, or content that is selected by the user to forward. The message certification utility then determines whether the message requires user authentication before the message is transmitted to a recipient (block 504).

According to at least one embodiment illustrated in block 506, the determination that the message requires user authentication can be based on at least one of: (i) the content of the message, (ii) a context associated with the communication device, (iii) historical data corresponding to a user associated with the communication device, and (iv) information associated with a recipient of the message. In one or more embodiments, the determination that the message requires user authentication can be "crowd-sourced" wherein a security level is based at least in part upon other individuals or systems designating similar messages or users as suspicious. In particular, such messages that have been flagged as spam by other users or have repeatedly failed authentication with other users would require elevated authentication and possibly even trigger a warning to the recipient.

In an illustrative example, the content of the message can have keywords identifying at least one of: a location from which the message is being transmitted; a weather condition at the location from which the message is being transmitted; a physical activity performed by a user who inputs the message; and a monetary value of significance that is settable by a user of the device; and type of information request by user. It is appreciated that this list is not intended to be exclusive or complete and that other keywords can be identified and/or specified, without limitation. In one embodiment, the presence within the message content of one or more of these keywords can indicate the need for user authentication of the message. In another illustrative example, the context of the communication device can be at least one of: a location of the communication device; a route taken by the communication device; an ambient environment of the communication device; and a motion detected by the communication device. As with the content list, it is appreciated that this list of contextual information is not intended to be exclusive or complete and that other contexts can be identified and/or specified, without limitation.

In yet another illustrative example, the historical data corresponding to a user associated with the communication device can be used to determine a need for authentication or serve as a baseline for comparison with a biometric input for authenticating a user. A profile derived from a user's historical data can serve as a point of contrast with the content of the message or the context associated with the communication device. The message certification utility can infer that the message is unexpected in some regard based at least in part upon the contrast.

The historical data can also contain past biometric inputs and templates of the user that can be relied upon for future authentications. Examples of such historical data can be a voice print or characterization that can be correlated with a voice that conveyed the message. Another example is a recorded image of a unique physical attribute of a user that can be compared to a new image taken by the communication device. An additional example of historical data is a recorded characteristic or pre-established motion of the user that can be compared to a motion detected by the communication device. A further example is a pre-set password, a pre-set security biographical response, a pre-established biometric image pattern (fingerprint, eye, etc.); a biographical attribute of the user (e.g., color of hair, eye, skin); a pre-established biometric audio pattern (sound sequence); a pre-established biometric electrical pattern (heart signature); and other pattern information of the user.

In a further example, information associated with a recipient of the message can be used to determine a need for authentication. For example, the degree of relatedness can be determined by whether the recipient is in an institutional or personal contact directory, whether the recipient is in regular communication contact with the user based upon prior messages, calls, or appointments. Another example of relatedness can be based upon social networking selections by the user.

Alternatively or in addition to analyzing content, context, historical data, and information about a recipient to determine a requirement for authentication, the message certification utility can determine credibility compromising factors of the message based on content or context (block 508). In another example embodiment, the method 500 can provide for: identifying a credibility compromising factor associated with at least one of (a) the content of the message and (b) a context associated with the communication device; determining that the message requires user authentication based on the identified credibility compromising factor; and determining that the message requires biometric user authentication based on a value of the credibility compromising factor being at least a threshold value.

The determination of the credibility compromising factor can be based upon at least one of (i) a monetary value included within the content of the message exceeding a pre-set threshold; (ii) a location that is pre-established as unexpected; (iii) a location that is unexpected based upon historical data for the authorized user; and (iv) a location that is unexpected based upon scheduling data for the authorized user (block 510). A monetary value or a particular location can be an example of a rule wherein any mention of certain keywords automatically, raises questions about whether the message is credible. For example, certain scam, spoof, or phishing messages can be associated with particular keywords, such as requesting money or private financial information. These particular keywords can be associated with particularly, disreputable countries that are known to harbor fraudulent enterprises. (comment above re crowd-sourcing may be relevant to this section)

In addition to publicly known credibility triggers, there can also be credibility compromising factors that are particular to the user that originates the message. A current location can be deemed to be a credibility comprising factor based upon knowing the history of locations regularly or periodically visited by the user, or specified in a schedule for the user. For example, if a user has appointments in a certain city but his communication device is located in another city, an inference can be made that the communication device has been misplaced, lent, or stolen. For another example, a network server can track a number of communication devices associated with an authorized user for months or years, noting tendencies of the communication device to transit mostly between a residential address and a work address. When a communication device that purports to be used by the authorized user requests authentication of a message, the network server can determine that the origin of the message is a location that is not between the residential address and work address. In such a case, the message certification utility can determine that the location presents a credibility compromising factor even though the location per se is not known to be one strongly associated with fraudulent activity.

Based upon analyses performed in blocks 504-508, the message certification utility can determine whether the message requires user authentication before the message is transmitted to a recipient (decision block 512). Based upon a determination in block 512 that user authentication is not required, the message certification utility allows the messaging utility to transmit the message to the recipient without authentication (block 514). Thereby, the user experience can be enhanced by avoiding an inconvenient step of verifying a message that does not require authentication. Alternatively; based upon a determination that user authentication is required in block 512, the message certification utility selects one or more biometric capturing components of the communication device (block 516).

In one embodiment illustrated in block 518, message certification utility selects the biometric capturing component based on contextual data by determining that at least one ambient condition indicates that a particular biometrical capturing device is ineffective. In an illustrative example, the at least one ambient condition can be: (i) moisture; (ii) an ambient illumination; (iii) an obstructed sensor; (iv) an activity associated with motion of the communication device; (v) a barometric pressure; and/or (vi) ambient noise (block 520), without limitation. In one embodiment illustrated in block 522, the message certification utility selects the biometric capturing component based on contextual data by determining, from at least one of historical data and recipient data, which biometric input is verifiable by a recipient of the message. For example, capturing a date-stamped image of the user can be a means of authentication in situations where the recipient can recognize the user.

In one embodiment illustrated in block 524, the message certification utility selects a biometric capturing component in order to cross-verify keywords for at least one of location, weather condition, and physical activity. Authentication can go beyond confirming the identity, of the user based upon biometric input(s). Authentication can be used to independently confirm and cross-verify contextual descriptions in the content of the message against sources of information accessible by the communication device. For example, the message can mention a location that the user was in, is currently in, or will be in. The communication device can access historical data for where the user has been during the appropriate time frame, can sense where the communication device currently is, and can access scheduled location information based upon appointments or travel itineraries to cross-verify these keywords. For another example, the message can state what the user is currently doing that can be cross-verified by sensing contextual data such as physiological sensors, motion sensors, etc. As an additional example, the message can describe a current ambient condition such as temperature, precipitation, etc., that can be cross-verified based upon detected contextual data.

Figure 5B:
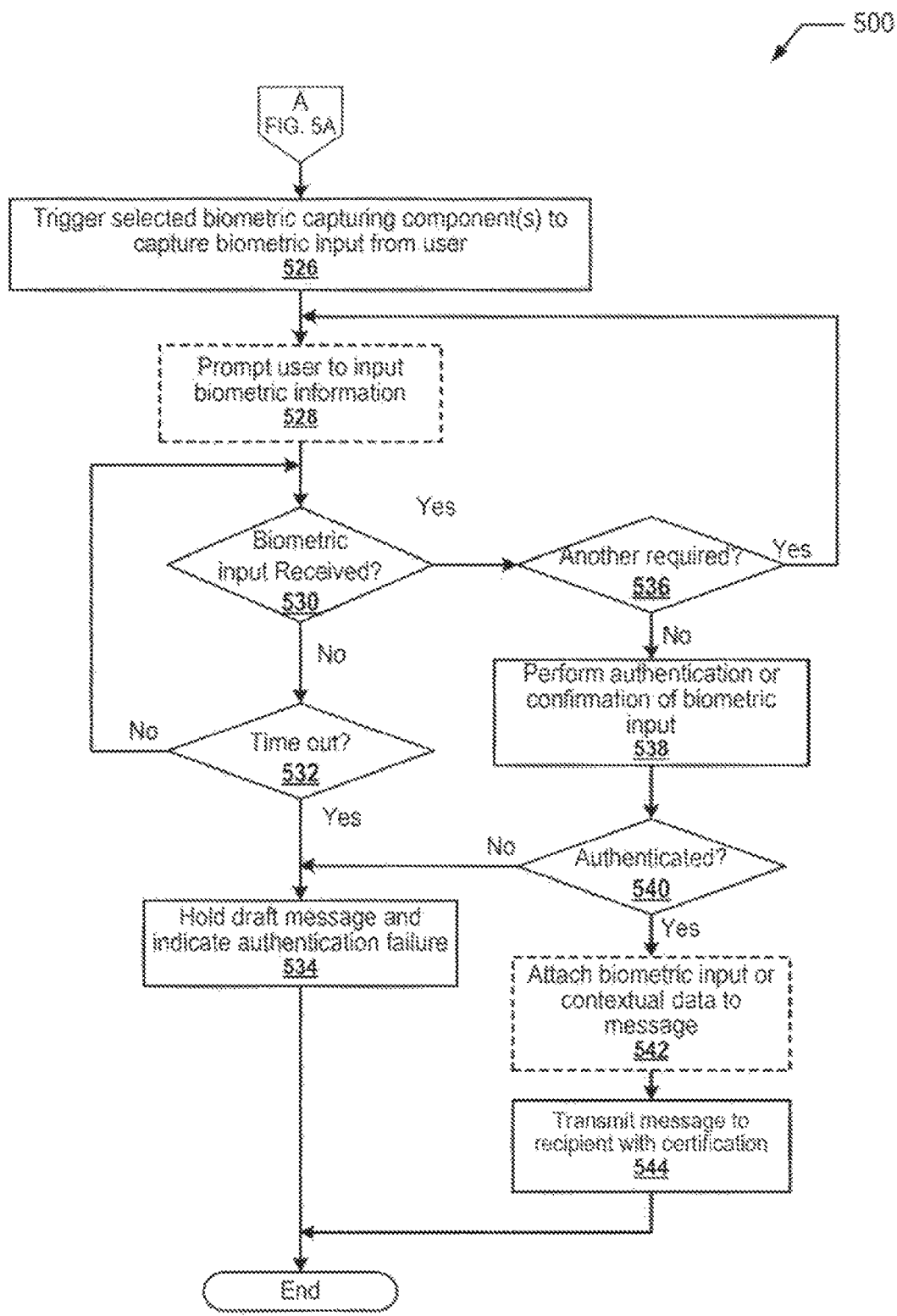

Continuing with FIG. 5B, with a need to authenticate the message determined and the biometric capturing component selected, in block 526 the message certification utility triggers at least one selected biometric capturing component to capture a corresponding biometric input from a user of the communication device. The triggering can be performed in the background such as with an always-on voice or always-on camera capability that can capture the selected biometric input without prompting a specific user response.

In an example embodiment, however, the method 500 further provides for generating and issuing a prompt requesting the biometric input at the selected biometric capturing component (block 528), and advising user of which biometric information is requested, or of the choices/options. A response time is established for receipt of the biometric input such that a determination can be repetitively performed to determine whether the requested biometric input has been received in decision block 530. Based upon a determination in decision block 532 that the response time has lapsed without receiving an authenticated biometric input, transmission of the draft message can be withheld and the user can be notified of the authentication failure (block 534).

In response to determining in decision block 530 that the requested biometric input was received, a further determination can be made whether another biometric input is required (decision block 536). When another biometric input is required in block 536, the user can be prompted again to input the specific second biometric information by returning to block 528.

Based upon the determination in decision block 536 that another biometric input is not required, the message certification utility performs authentication of the received biometric input (block 538). For example, when the selected biometric capturing component is a camera of the communication device, the message certification utility can: capture an image of the device user; perform facial recognition of the captured image; and authenticate the user in response to the facial recognition identifying a match with a pre-identified image of the user.

Figure 6:
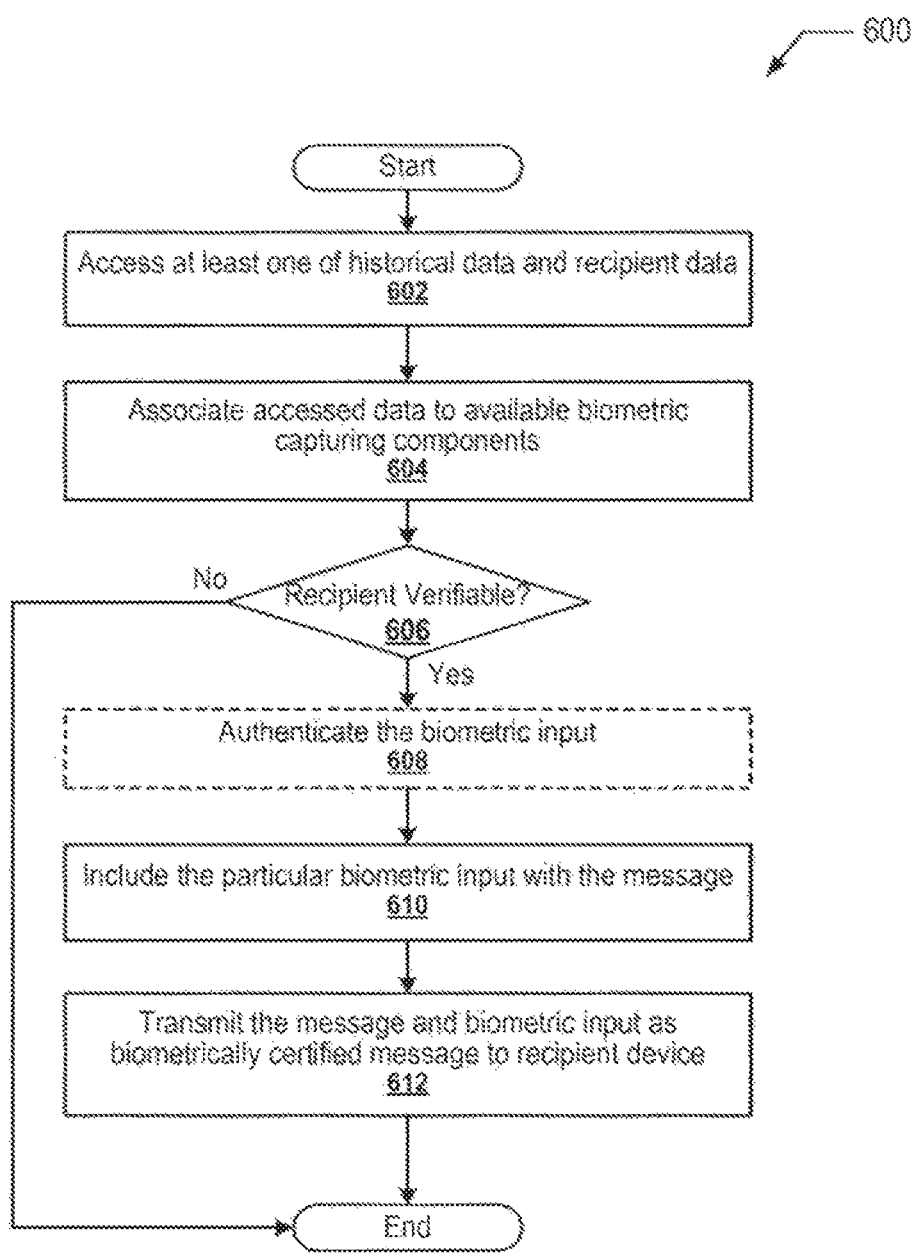
FIG. 6 is a flow chart of a method for selecting a biometric capturing component based at least in part upon the recipient of a message being able to verify the corresponding biometric input, according to one embodiment.

At block 540 the message certification utility can determine whether the user was authenticated. Based upon a determination in decision block 540 that the user was not authenticated, the message can be held and an indication of authentication failure provided to the user (block 534). However, based upon a determination in decision block 540 that the user was authenticated, the message certification utility can enable transmission of the message. The recipient can be aware that the messages received from the sender are authenticated as necessary before transmission. In an exemplary embodiment, the communication device includes certified biometric input(s) or contextual data with the message (block 542). Then the messaging utility transmits the message with certification in response to authenticating the biometric input as belonging to an authorized user of the communication device (block 544). May be noteworthy that encryption technology would likely be used for the storing and transmission of the biometric data to ensure it is not misappropriated, FIG. 6 illustrates an example method 600 for selecting a biometric capturing component based at least in part upon the recipient being able to verify the corresponding biometric input. In one embodiment illustrated in block 602, the message certification utility accesses at least one of historical data and recipient data. The message certification utility associates accessed data to relevant biometric capturing components (block 604), For example, the message certification utility can access a telephone log that indicates that the user and the recipient have frequently spoken, and thus the recipient should recognize the voice of the user. For another example, the message certification utility can access a web conference or meeting schedule and determine that the user and recipient have frequently been in the same room, and thus the recipient should recognize the face of the user. For another example, the message certification utility can access previous correspondence between the user and the recipient and determine that the recipient anticipates that the user would be in a particular context at the time that the message originated. Thus, including the historical data in the authentication can enable the message certification utility to cross-verify the circumstances of the message transmission and select an appropriate biometric capturing component.

In decision block 606, based upon the historical data and/or recipient data, the message certification utility determines whether a particular biometric input is verifiable by a recipient of the message. When the recipient cannot verify the particular biometric input, the method 600 can exit, relying upon another basis for authentication. However, based upon a determination in block 606 that a particular biometric input is verifiable by the recipient, the message certification utility can select a corresponding biometric capturing component. In some instances, the message certification utility can authenticate the particular biometric input before transmission (block 608). In lieu of or in addition to this sender-side automatic authentication, the message certification utility can include the particular biometric input that is verifiable by the recipient within a message packet generated for the message (block 610). The communication device transmits the message with the biometric input included therein as a biometrically certified message for verification at a recipient device (block 612). Method 600 then ends.

Figure 7:
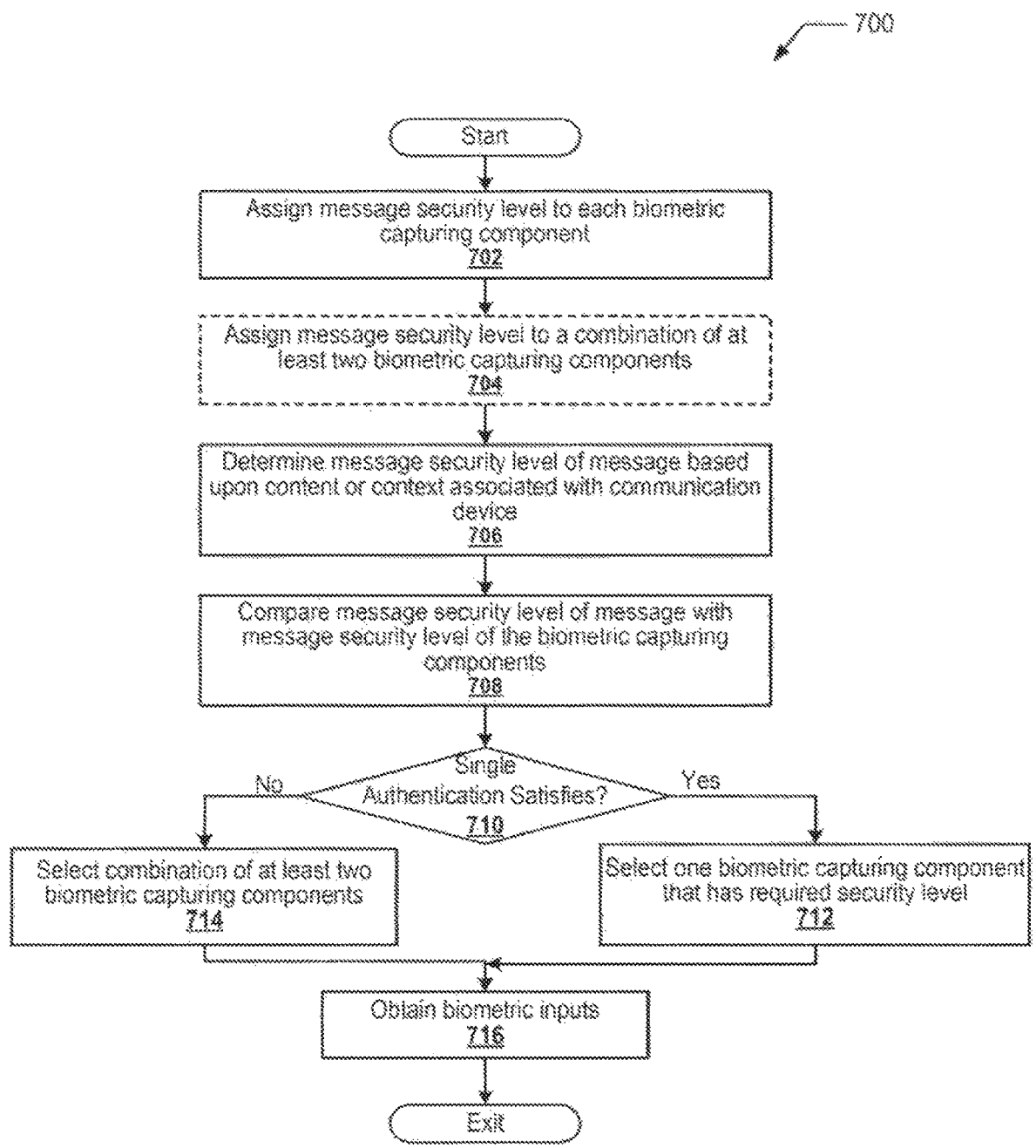
FIG. 7 is a flow chart of a method for assigning a security level to each biometric capturing component and selecting a biometric capturing component based at least in part upon satisfying a message security level, according to one embodiment.

FIG. 7 illustrates an example method 700 by which the message certification utility assigns a security level to each biometric capturing component and determines what security level is required for a particular message. Selection of a particular biometric capturing component among the multiple available biometric capturing components is based at least in part upon the selected component satisfying a security level for the particular message. In an exemplary aspect, the method 700 further provides using more than one biometric input in order to satisfy a particular security level of the message. Beginning in block 702, the message certification utility assigns a specific message security level to each biometric capturing component. In at least one embodiment, the message certification utility assigns a specific message security level that requires a message authentication via a combination of at least two biometric capturing components (block 704). An example of a requirement for an increased security level can be based upon one or more factors, such as inferring what action is being requested of the recipient. For example, a message that simply presents information and is determined to make no demand upon the recipient can have a first security level. Another message that includes a monetary value above a certain threshold amount (e.g., $5.00) and is determined to be a request for money from the recipient can be assigned a second, higher security level. As another example, a message that requests personal information that triggers a privacy concern could warrant a third, even higher security level.

In block 706, the message certification utility determines a security level of the message associated with or based upon at least one of (a) the content of the message (e.g., through introspection and keyword search) and (h) a context associated with the communication device. In block 708, the message certification utility compares the security level determined for the message with the security level assigned to each biometric capturing component. In decision block 710, the message certification utility determines whether a single biometric capturing component can satisfy the security level of the message. When a single biometric capturing component can satisfy the security level of the message in decision block 710, the message certification utility selects an appropriate biometric capturing component (i.e., a biometric component that satisfies the message security level), based upon the message security level and a current context of the communication device (block 712). When a single biometric capturing component cannot satisfy the message security level of the message, the message certification utility selects a combination of at least two biometric capturing components that collectively satisfy the message security level of the message (block 714), The message certification utility obtains the selected biometric input(s) either automatically, by prompting, or a combination of both (block 716). Method 700 then ends.

Figure 8:
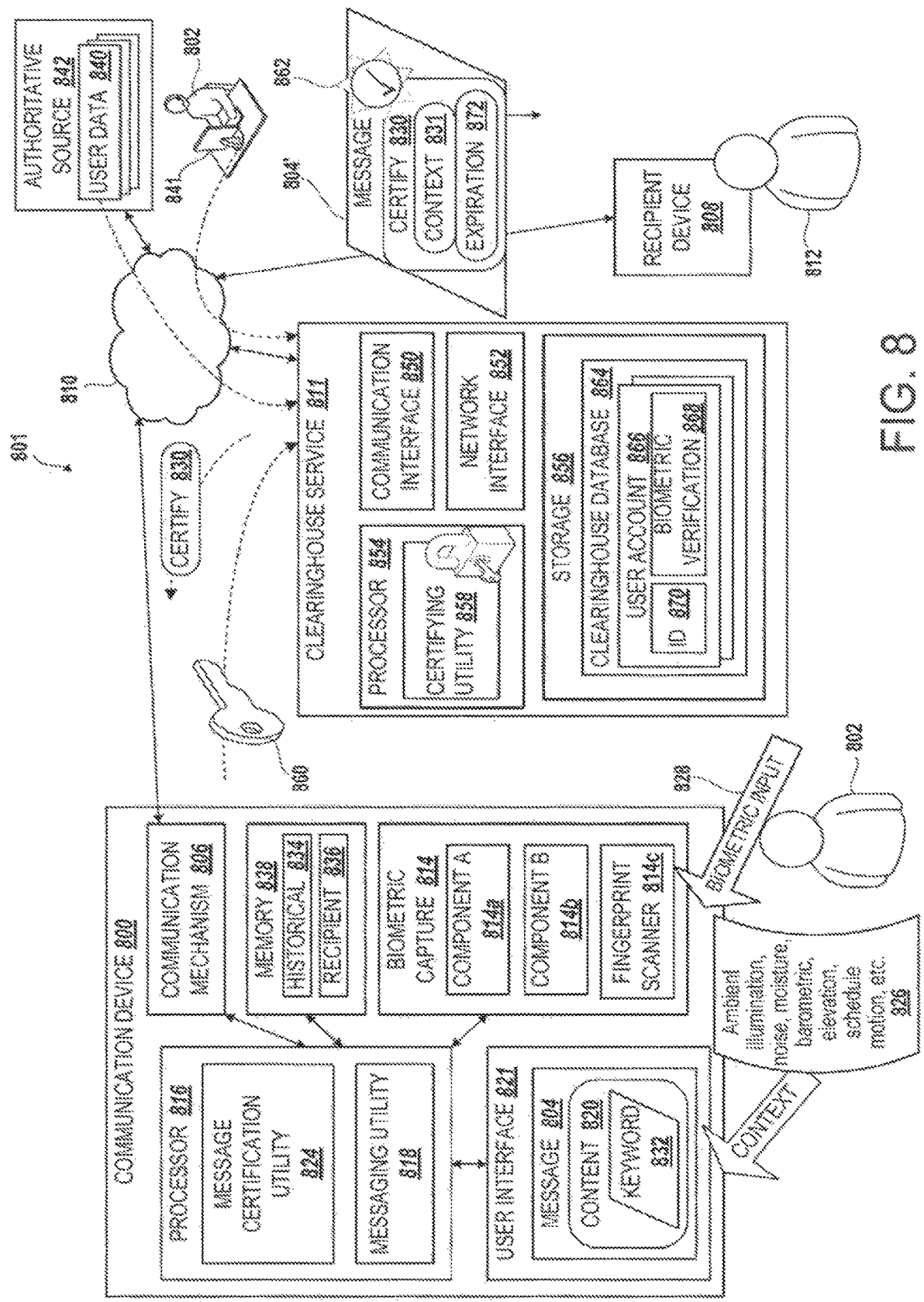
FIG. 8 illustrates an example message transfer and authentication (MTA) environment having a service that authenticates biometrically certified messages being transmitted from one or more communication devices, according to one or more embodiments.

In FIG. 8, there is depicted a block diagram representation of an example user and/or message authentication environment 801 in which several of the clearinghouse authentication features of the disclosure can be implemented. According to the general illustration, authentication environment 801 includes communication device 800, clearinghouse service 811, authoritative source 842, and recipient device 808, each communicatively connected to one or more of the other devices via one or more networks.

Communication device 800 is a processing device of a user 802 who originates a message 804' that is to be transmitted by a communication mechanism 806 to another communication device (e.g., recipient device 808) via a network 810 in a communication system 801. The communication device 800 can interact with a clearinghouse service or server ("clearinghouse") 811 to authenticate the user 802 who originated the message 804'. For example, the message can be an email, an audio recording, a MMS message, a SMS message, or other type of transmittable message. The communication device 800 includes at least one biometric capturing component 814, which for clarity is depicted as a first biometric capturing component "A" 814a and a second biometric capturing component "B" 814b. At least one processor 816 is communicatively coupled to the communication mechanism 806 and to the at least one biometric capturing component 814. A messaging utility 818 executes on the at least one processor 816 and configures the communication device 800 to receive content 820 of a message 804' via a user interface device 821 of the communication device 800.

According to one or more embodiments, a message certification utility 824 executes on the processor 816. Based on a determination that the message 804' requires user authentication before the message is transmitted to a recipient (e.g., user 812), message certification utility 824 selects, based on content 820 of the message 804' or contextual data 826, one or more biometric capturing components 814 of the communication device 800; triggers at least one selected biometric capturing component 814 to capture a corresponding biometric input 828 from a user 802 of the communication device 800; and transmits an authenticated message 804' in response to authenticating the biometric input 828 as belonging to the user 802 who is authorized for the communication device 800.

According to one embodiment, the message certification utility 824 can configure the communication device 800 to select the biometric capturing component 814 based on the contextual data 826. The contextual data 826 can include one or more ambient conditions that can be utilized to select which biometric capturing device is best for the condition and/or indicate whether a particular biometrical capturing device is ineffective given the specific ambient condition. Examples of the ambient conditions can include: (i) moisture; (ii) an ambient illumination; (iii) an obstructed sensor; (iv) an activity associated with motion of the communication device; (v) a barometric pressure; (vi) ambient noise; (vii) ambient temperature; and/or (viii) elevation.

In at least one exemplary implementation, the authenticated message 804' can include a certification 830 by the clearinghouse 811 that conveys to the recipient (user 812 of recipient device 808) that the message 804' was authenticated. Centralizing this authentication function can provide certain advantages, such as reducing computational requirements for the communication device 800, increasing the subjective confidence in the authentication by the recipient (user 812), and/or leveraging user data 840 maintained about the user 812 by an authoritative source 842 to objectively obtain a higher degree of confidence in the identity of the user 802. It should be appreciated that this list of advantages is neither all inclusive nor necessarily realized in each embodiment.

In addition, the certification 830 can incorporate the biometric input 828 as contextual information 831 into the authenticated message 804' to bolster confidence in the authentication. In one embodiment, the certification 830 can provide an indication that the contextual information 831 was automatically incorporated by the clearinghouse 811 without manipulation by the user 802. The contextual information 831 can further enable the recipient (user 812) to confirm the authentication. In certain instances, the clearinghouse 811 can merely certify the contextual information 831 without necessarily authenticating the user 802 that originated the authenticated message 804'.

In one embodiment, the contextual information 831 can use location alone as a validation method without necessarily having a direct tie to name or mailing address of the user or even a biometric input such as a fingerprint. In this scenario, the user 802 can validate location without pre-registering. When the user selects an option to use location validation, the location of the user 802 is captured and embedded in the authenticated message 804' being sent at that instant. The authenticated message 804' and location data can be encrypted together. A link can then be offered to the recipient to click to see where the sender was at the moment the message was sent from the communication device 800. Although a precise address is possible with Global Positioning System (GPS), the city or zip code may be transmitted instead to offer a degree of privacy. For example, the recipient (user 812) knowing the city from which user 802 is transmitting the communication may receive a sufficient level of assurance.

Similarly, the contextual information 831 can provide a level of validation via an image or video taken with a front-facing imager of the communication device 800. For example, the user 802 can opt to allow certification by having an image taken and encrypted in an inseparable fashion with their authenticated message 804' such that the recipient (user 812) could view the just-taken image. In the case of a video capture, the user 802 could furthermore be shown a random phrase to speak so the phrase can be viewed with the video on the recipient device to make it more difficult to pre-record the video and spoof the system. In many cases just being able to see the face of the user 802 provides a sufficient level of assurance rather than allowing outdated or scam images to be used. It is appreciated that a combination of contextual information 831 and identity authentication can provide a more secure option. For example, recipients can click a link to get the name, mailing address city, current image or video, and current location city (or even a map snapshot thereof) of those attempting to contact or associate with them.

In an exemplary embodiment, the user 802 can set up authentication prior to composing the message 804. To that end, the user 802 logs into a website, a distinct separate site, or this feature is added as an option to a user's existing internee email account. The user 802 can select to subscribe to the Certified Clearinghouse option. User is prompted to sign up for a Clearinghouse Wallet account or log in to an existing Wallet account. User can be asked to scan a portion of their body such as a fingerprint, face, eye vein, palm vein, finger vein, retina, etc. and/or other biometrics characteristics, on a device linked to an Internet messaging account. For example, the user 802 can compose an email message on a personal computer (PC) desktop or laptop but could do the fingerprint scan on a cell phone that is also linked to that account. The fingerprint data is encrypted and sent to the clearinghouse server. When the user 802 either sends an email or SMS/MMS, initiates an online chat session, invites a person to an online forum, opens or joins an online social venue, etc., or responds to such interactions, the user can be given the option of using "Certified Clearinghouse Identity". If selected, the user is then asked to perform a fingerprint scan immediately after hitting the send button. The fingerprint data may be encrypted together with the message content to make hacking or separating the two more difficult. The fingerprint data is then extracted on the server end and compared with the data on file. If the data matches, then recipients of these messages get a "Certified Clearinghouse Identity" link they can click, which will then share select information with the sender, such as the name and perhaps city and address associated with the Wallet account. Subscribers can also request that recipients to reciprocate with their certification link.

With continued reference to FIG. 8, the message certification utility 824 can configure the communication device 800 to transmit the authenticated message 804' in response to authenticating the biometric input 828 by the clearinghouse 811. The clearinghouse 811 can be executed on the server 224 (FIG. 2) and include a communication interface 850 that enables communication with communication devices (such as communication device 800) that generate authenticated messages 804' for transmission to recipient devices (e.g., recipient device 808). Clearinghouse 811 communicates, over network interface 852, with an authoritative source 842 that provides unique identifying information about one or more users (user data 840). Clearinghouse 811 includes at least one processor 854, which is coupled to the communication interface 850 and the network interface 852. A storage device 856 coupled to the processor 854 includes a certifying utility 858 that executes on the processor 854 to configure the clearinghouse 811 to perform operations for user authentication as disclosed herein.

FIG. 8 illustrates the clearinghouse 811 responding to an authenticating input 860 from the communication device 800 with a certification 830 for the communication device 800 to include with the authenticated message 804'. The authenticating input 860 can be user data 840 that the clearinghouse 811 validates with the authoritative source 842 or can be biometric inputs 828 that the clearinghouse 811 validates against its clearinghouse database 864. Embodiments consistent with the present disclosure can include the clearinghouse service relaying the authenticated message 804' with the certification 830, such as a digitally encrypted and signed certification token 862 of the authenticated message 804'.

Prior to receiving biometric input 828 for message authentication from the communication device 800, the clearinghouse 811 can receive a request to create a user account 866 for the user 802. The request can be made from communication device 800 or another communication device 841. In response to receiving the request, the certifying utility 858 can select information about the user 802 from the user data 840 via the network interface 852 from the authoritative source 842. The certifying utility 858 can prompt the user 802 (via the communication interface 850) to provide an entry of data corresponding to the selected information. In response to the clearinghouse 811 receiving, from the user 802, the data entry that corresponds to the selected information, the certifying utility 858 can prompt the user 802 to submit one or more clearinghouse biometric verification inputs 868. The certifying utility 858 can associate the submitted clearinghouse biometric verification inputs 868 with a user identifier 870 assigned to the user 802. The certifying utility 858 can store the clearinghouse biometric verification inputs 868 and user identifier 870 within the clearinghouse database 864 for future access by the user 802 via the communication device 800 to user-authenticate a message 804.

In particular, the clearinghouse 811 can subsequently receive a biometric input 828 from the communication device 800 and compare the received biometric input 828 against clearinghouse biometric verification input's 868 of registered users in order to authenticate a user 802 of the communication device 800. In response to authenticating the user, the certifying utility 858 of the clearinghouse 811 generates and transmits a certification token 862 to the communication device 800 for inclusion in the authenticated message 804' being transmitted by the communication device 800 to the recipient device 808.

In one embodiment, the clearinghouse 811 may be the entity that associates the biometric input 828 with the user 802. Alternatively, the authoritative source 842 may maintain the clearinghouse biometric verification input/s 868 for access by, or for transfer to, the clearinghouse 811. Thereby, a first interaction of the user 802 with the clearinghouse 811 may be made with a biometric input 828.

In one aspect, authentication of a biometric input 828 can be wholly performed at the clearinghouse 811 with the processing performed by the communication device 800 being confined to capturing the biometric input 828. Alternatively, certain biometric capturing components 814 can require a two-part authentication process with a first image analysis portion performed on the communication device 800 and a second matching portion performed by the clearinghouse 811. Biometric input 828 can be analyzed on communication device 800 in order to extract characteristics that uniquely identify the biometric input 828. Transmitting and storing only these characteristics can reduce a quantity of resources consumed by the authentication environment 801. For example, correlating a two dimensional image corresponding to a fingerprint, retina, face, etc., in the first instance can be performed at the clearinghouse 811. In the second instance, the communication device 800 can extract the essential, distinguishing features of the biometric input 828 that correspond to like features tracked by the clearinghouse 811.

Consider as an illustration use of fingerprint scanners. Matching algorithms can be used to compare previously stored templates of fingerprints against candidate fingerprints for authentication purposes. In order to do this, the original image can be directly compared with the candidate image or certain features may be compared. Pattern based algorithms compare the basic fingerprint patterns (arch, whorl, and loop) between a previously stored template and a candidate fingerprint. This can require that the images be aligned in the same orientation. To do this, the algorithm finds a central point in the fingerprint image and centers on that. In a pattern-based algorithm, the template contains the type, size, and orientation of patterns within the aligned fingerprint image. The candidate fingerprint image is graphically compared with the template to determine the degree to which it is a match and a match score is generated. Other algorithms can use minutiae features on the finger. The major minutia features of fingerprint ridges are: ridge ending, bifurcation, and short ridge (or dot). The ridge ending is the point at which a ridge terminates. Bifurcations are points at which a single ridge splits into two ridges. Short ridges (or dots) are ridges that are significantly shorter than the average ridge length on the fingerprint. The communication device 800 can analyze the scanned fingerprint to detect to the presence of minutiae and patterns. The resulting authentication confirmation code can be transmitted to the clearinghouse 811 for association. Thereby, the authentication network 801 can provide throughput increases as well as expanding the range of devices that a user 802 may use with benefits of authentication.

In one embodiment, the biometric capturing component 814 of the communication device 800 is a scanner that captures the corresponding biometric input 828 comprising a pattern from a portion of the body of the user 802 of the communication device 800. In the illustrated example, the optical scanner is a fingerprint scanner 814e, which captures a finger print image. As a non-exclusive list of other examples of biometric inputs involving the user's body, the captured image can include the user's face, retina, iris, eye vein, palm vein, and finger vein and/or other biometric characteristics. The fingerprint scanner 814c of the communication device 800 generates an authentication confirmation code based upon the pattern. This code may also be generated by the communication device 800 following synchronization or a match of on-device coding with coding stored at the clearinghouse 811. Thereby, transmission efficiency can be realized by downloading coding of previous users of the communication device 800 in advance. The pattern can be detected in different areas of the electromagnetic spectrum (e.g., visual, optical, infrared, etc.) or be based on electromagnetic fields (e.g., capacitance). The pattern may be two-dimensional or include variation over time (e.g., audio, electrocardiogram). The authentication confirmation code incorporates information about pattern and minutiae features detected by the fingerprint scanner 814c. The clearinghouse 811 receives the authentication confirmation code as an authenticating input 860 that is forwarded by the communication device 800. The clearinghouse 811 performs an association of the received biometric input 828, which comprises the authentication confirmation code, to authoritative information associated with the user 802. The authoritative information can be user data 840 from the authoritative source 842 or the clearinghouse biometric verification inputs 868. The clearinghouse 811 provides an authentication, such as the certification 830 or certification token 862, in response to the association being successful. In turn, the communication device 800 can receive authentication of the user 802 from the clearinghouse 811 and transmit the authenticated message 804' in response to receiving the authentication.

The certifying utility 858 of the clearinghouse 811 can incorporate mitigation for a user 802 that loses control of the communication device 800 after the biometric input 828 is input. For example, the clearinghouse 811 can embed an expiration criterion 872 with the certification token 862 that dynamically invalidates the certification token 862 based on an occurrence of one of more pre-established conditions at one of the communication device 800 and the recipient device 808. For example, a pre-established condition can require that the transmitted time-date stamp for an authenticated message 804' must be within a certain time interval from when the clearinghouse 811 generated the certification token 862. As another example, the pre-established condition can require that the user 802 maintain control of the communication device 800 between the time of request for authentication until a second event such as transmission of the authenticated message 804'. Thus, a short timer can expire if the communication device 800 is not actively receiving user inputs that are indicative of user control. Alternatively, the communication device 800 can be required to maintain image capture of a portion of the user's body to perform pattern recognition of the user 802 during the process of authenticating and transmitting the authenticated message 804'. For example, the image capture can include face, retina, iris, eye vein, palm vein, and finger vein and/or other biometrics characteristics.

Figure 9:
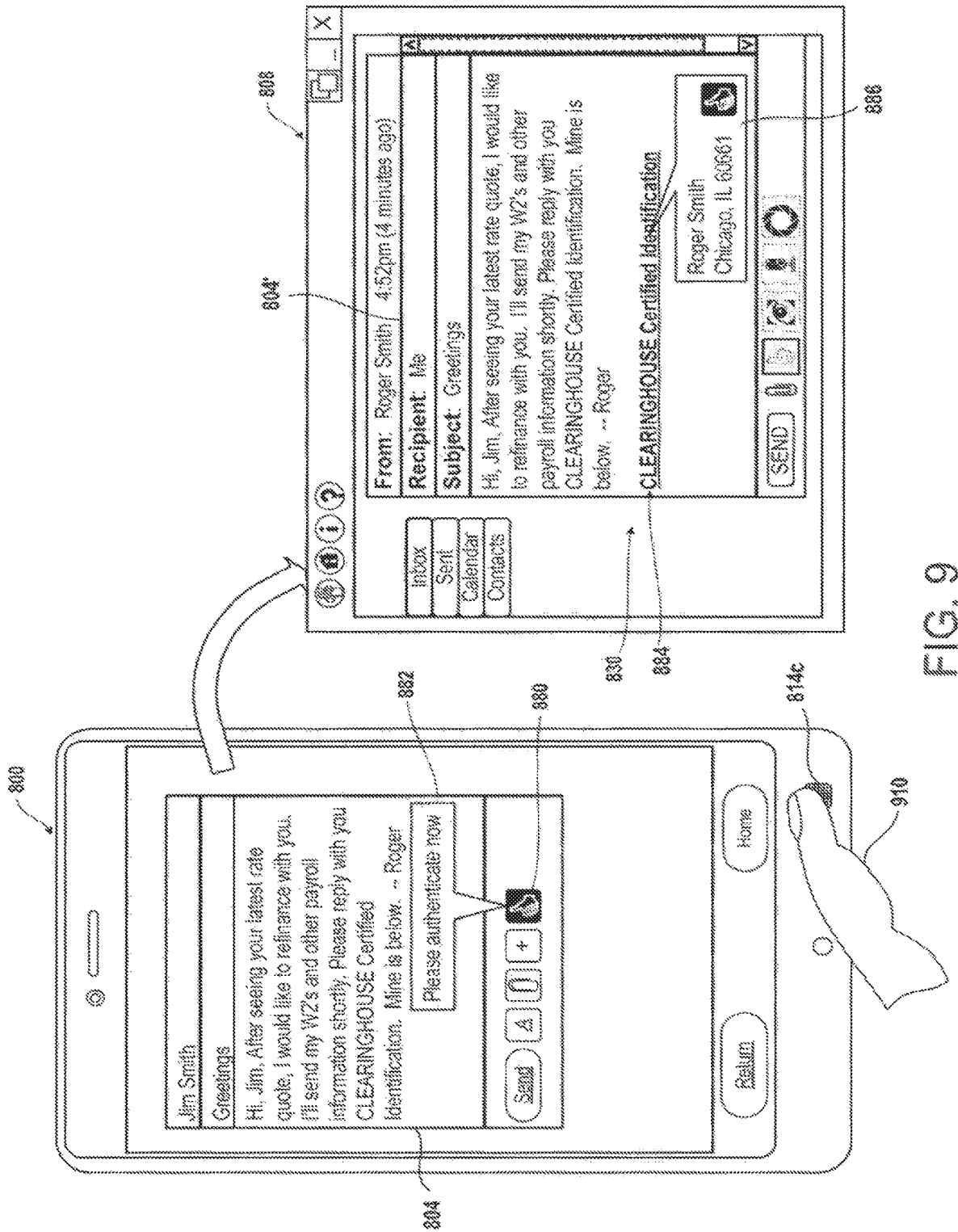
FIG. 9 depicts example user interfaces of communication devices that interact the clearinghouse server, according to one embodiment.

FIG. 9 illustrates the transition of an example message 804 originating on communication device 800 and to an authenticated message 804' at a recipient device 808 following clearinghouse authentication of the user 802 and/or certifying of the message 804. According to one or more embodiments, several content related items and/or contextual situations can trigger the need for authentication by a clearinghouse. A notification 880 and an indication 882 are provided on the user interface 121 to inform the user 802 of an appropriate biometric input to provide. In response, the user 802 provides a corresponding biometric input, illustrated as user's finger 910 interacting with the fingerprint scanner 814e.

As shown within authenticated message 804' and in accordance with one or more embodiments, the certification 830 can be interactive in a received authenticated message 804'. For example, the recipient can be provided with a clickable link 884 within the message 804'. Then, when the user selects the link, the recipient is provided with the name and address of the sender as contextual information 886. In the context of this dialog, the recipient can be requested to reply-in-kind to validate his identity, in one embodiment.

Figure 10:
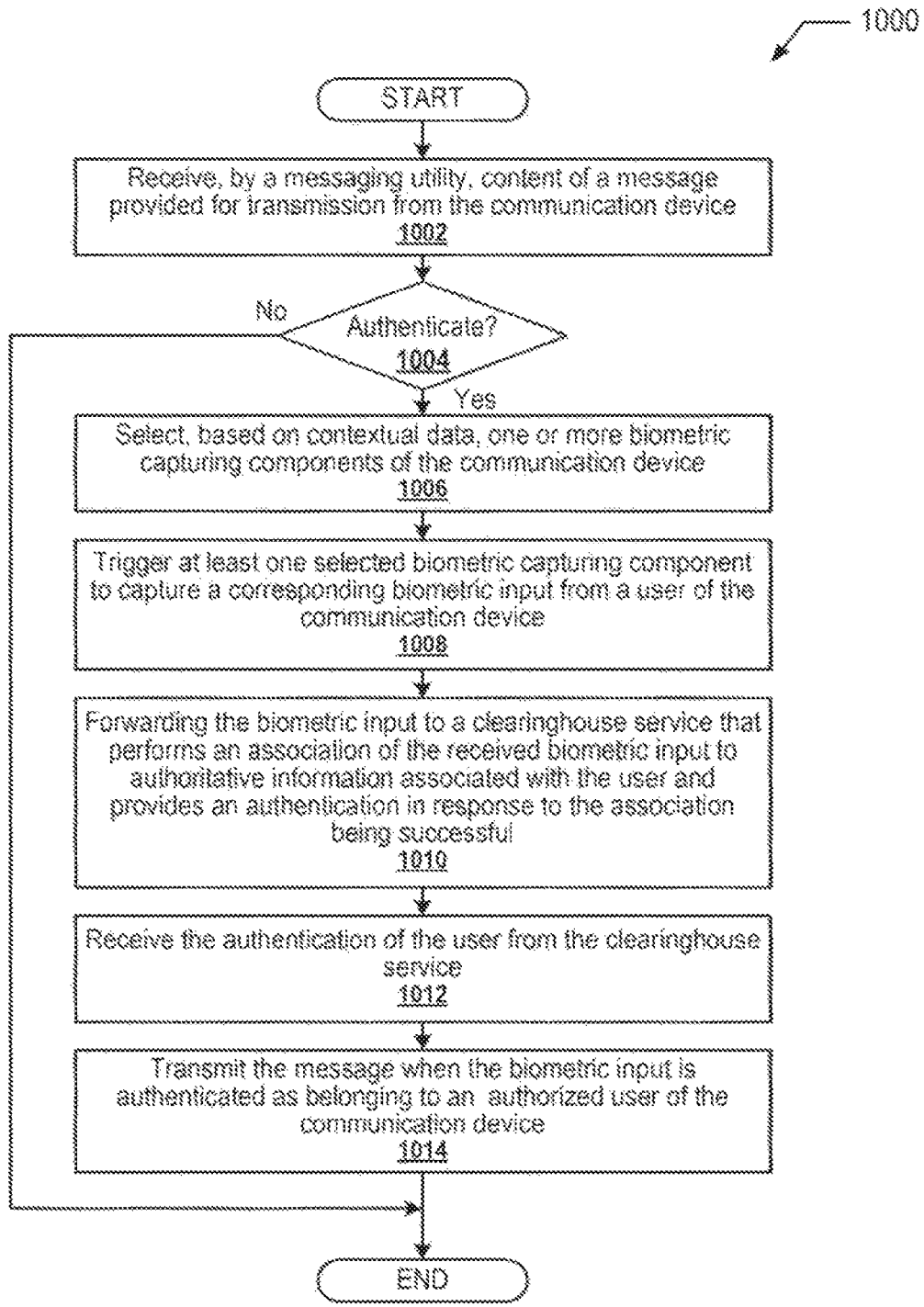
FIG. 10 is a flow chart of a method by which a communication device transmits a biometric input to a clearinghouse to authenticate a user of the communication device prior to transmitting a message.

FIG. 10 illustrates a method 1000 for user authentication of a message being transmitted from a communication device using a clearginhouse service. In block 1002, the method 1000 includes receiving, by a messaging utility, content of a message provided for transmission from the communication device. Following receipt of the message content, the messaging utility determines in block 1004 whether the message requires user authentication before the message is transmitted to a recipient. In response to determining in decision block 1004 that the message does not require user authentication before the message is transmitted to a recipient, the method 1000 ends.

In response to determining in decision block 1004 that the message requires user authentication before the message is transmitted to a recipient, the method 1000 includes selecting, based on contextual data, one or more biometric capturing components of the communication device (block 1006). In block 1008, the message certification utility triggers at least one selected biometric capturing component to capture a corresponding biometric input from a user of the communication device. The method 1000 includes forwarding the biometric input to a clearinghouse service that performs an association of the received biometric input to authoritative information associated with the user and provides an authentication in response to the association being successful (block 1010). The communication device receives the authentication of the user from the clearinghouse service (block 2012). In block 1014, the communication device transmits the message in response to receiving the authentication.

In one embodiment method, the method 1000 includes selecting a fingerprint scanner of the one or more biometric capturing components of the communication device. Thus, the method 1000 can include triggering the fingerprint scanner to capture the corresponding biometric input of a fingerprint pattern from the user of the communication device; receiving an authentication confirmation code from the fingerprint scanner that is based upon the fingerprint pattern; and forwarding the biometric input comprising the authentication confirmation code to a clearinghouse service that performs an association of the received biometric input to authoritative information associated with the user and provides an authentication in response to the association being successful. In other embodiments, other types biometric capturing components 814, such as face or retina, iris, eye vein scanners, palm vein scanners, finger vein scanners, can perform part of the authentication by generating an authentication confirmation code as the authenticating input 860.

Figure 11:
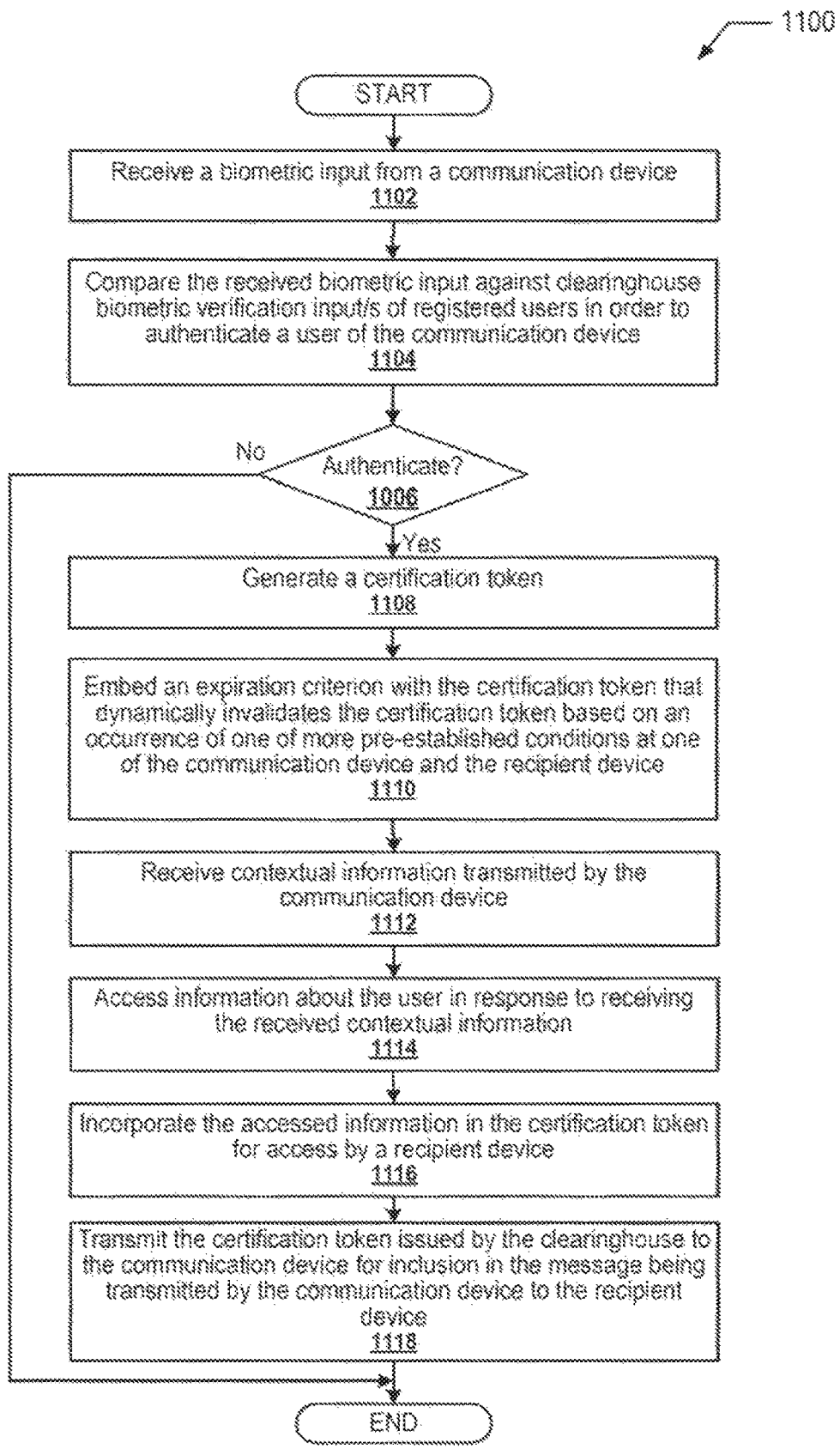
FIG. 11 is a flow chart of a method by which a clearinghouse is utilized to authenticate a user of a communication device prior to transmitting messages originating from the communication device, according to one embodiment.

FIG. 11 illustrates a method 1100 for user authentication by a clearinghouse for a message being transmitted from a communication device to a recipient device. In block 1102, the method includes the clearinghouse receiving a biometric input from a communication device. The certifying utility of the clearinghouse compares the received biometric input against clearinghouse biometric verification input/s of registered users in order to authenticate a user of the communication device (block 1104). In decision block 1106, a decision is made as to whether the user is authenticated based upon the comparison of the received biometric input against the clearinghouse biometric verification input/s. In response to determining in decision block 1106 that the user is not authenticated, the method 1100 ends. In response to determining in decision block 1106 that user is authenticated based upon the comparison of the received biometric input against the clearinghouse biometric verification input/s, the method 1000 includes generating a certification token in block 1108.

In one embodiment method, the clearinghouse embeds an expiration criterion with the certification token that dynamically invalidates the certification token based on an occurrence of one of more pre-established conditions at one of the communication device and the recipient device (block 1110).

In one embodiment of method 1100, the clearinghouse also receives contextual information transmitted by the communication device (block 1112). The clearinghouse accesses information about the user in response to receiving the contextual information (block 1114). In block 1116, the clearinghouse incorporates the accessed information in the certification token for access by a recipient device.

At block 1118, method 1100 includes transmitting the certification token to the communication device for inclusion in the message being transmitted by the communication device to the recipient device. Method 1100 then ends.

Figure 12:
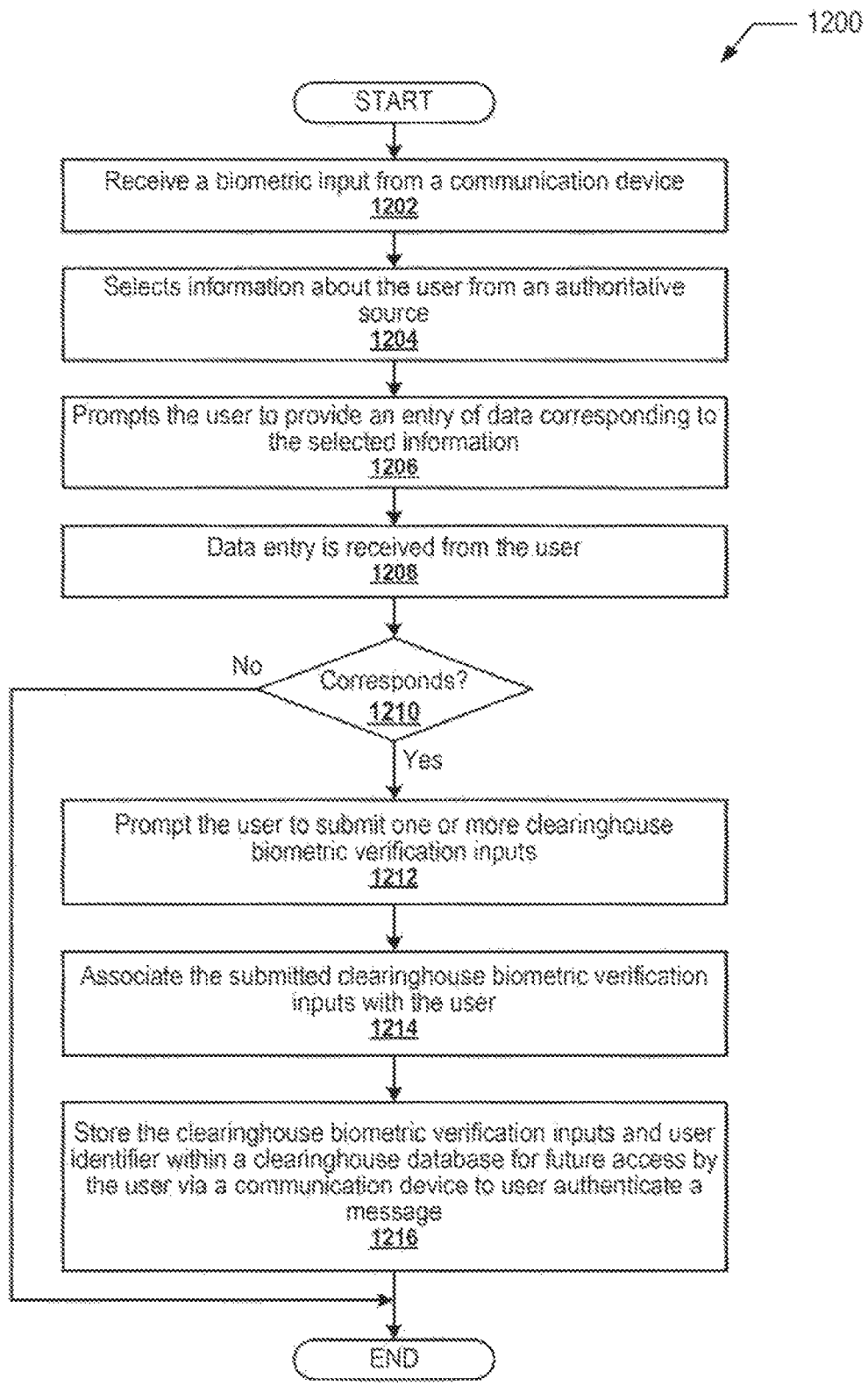
FIG. 12 is a flow chart of a method by which a user creates a user account with the clearinghouse for subsequent authentications, according to one embodiment.

FIG. 12 illustrates a method 1200 of authenticating a user and establishing user authentication parameters at a clearinghouse. Method 1200 includes the clearinghouse receiving a request to create a user account for the user (block 1202). This process would necessarily occur prior to receiving biometric inputs for message authentication from the communication device. In response to receiving the request, the clearinghouse selects information about the user from an authoritative source (block 1204). The clearinghouse prompts the user to provide an entry of data corresponding to the selected information (block 1206). The data entry is received from the user (block 1208). In response to receiving, from the user, the data entry, a determination is made whether the data entry corresponds to the selected information (decision block 1210). In response to determining in decision block 1210 that the data entry does not correspond to the selected information, then method 1200 ends. In response to determining in decision block 1210 that the data entry corresponds to the selected information, the clearinghouse prompts the user to submit one or more clearinghouse biometric verification inputs (block 1212). In block 1214, the clearinghouse associates the submitted clearinghouse biometric verification inputs with the user. The method 1200 then includes storing the clearinghouse biometric verification inputs and user identifier within a clearinghouse database for future access by the user via a communication device to user authenticate a message (block 1216).

In the flow chart of FIGS. 5A-5B, 6 and 10-12 presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method for user authentication of a message being transmitted from a communication device, the method comprising:

receiving content of a message provided for transmission from the communication device;

determining, by a message certification utility and based on the content of the message provided for transmission from the communication device, to authenticate a biometric input from a user of the communication device before allowing transmission of the message, wherein determining to authenticate the biometric input from the user of the communication device based on the content of the message comprises identifying a content-related trigger associated with a request to send money;

in response to the message certification utility determining to authenticate the biometric input from the user of the communication device based on the content of the message, triggering a biometric capturing component to capture the biometric input from the user of the communication device; and transmitting the message when the biometric input is authenticated by the message certification utility as belonging to an authorized user of the communication device.

2. The method of claim 1, further comprising:
identifying a credibility compromising factor associated with at least one of (a) the content of the message or (b) a context associated with the communication device;
determining that the message requires user authentication based on the identified credibility compromising factor; and
determining that the message requires biometric user authentication based on a value of the credibility compromising factor being at least a threshold value.

3. The method of claim 2, wherein the credibility compromising factor comprises at least one of (i) a monetary value included within the content of the message exceeding a pre-set threshold; (ii) a location that is pre-established as unexpected; (iii) a location that is unexpected based upon historical data for the pre-established authorized user; or (iv) a location that is unexpected based upon scheduling data for the pre-established authorized user.

4. The method of claim 1, further comprising selecting the biometric capturing component based on contextual data by determining that at least one ambient condition indicates that a particular biometrical capturing device is ineffective, wherein the at least one ambient condition comprises at least one of (i) moisture; (ii) an ambient illumination; (iii) an obstructed sensor; (iv) an activity associated with motion of the communication device; (v) a barometric pressure; or (vi) ambient noise.

5. The method of claim 1, further comprising determining that the message requires user authentication based on at least one of a context associated with the communication device, historical data corresponding to a user associated with the communication device, or information associated with a recipient of the message.

6. The method of claim 5, wherein:
the content of the message comprises keywords identifying at least one of: a location from which the message is being transmitted; a weather condition at the location from which the message is being transmitted; a physical activity performed by a user who inputs the message; or a monetary value of significance that is settable by a user of the communication device;
the context of the communication device comprises at least one of: a location of the communication device; a route taken by the communication device; an ambient environment of the communication device; or a motion detected by the communication device;
the historical data corresponding to a user associated with the communication device comprises at least one of: a voice that conveyed the message; an image of a unique physical attribute of a user taken by the communication device; a motion detected by the communication device; a pre-set password; a pre-set security biographical response; a pre-established biometric image pattern; a biographical attribute of the user; a pre-established biometric audio pattern; a pre-established biometric electrical pattern; pattern information of the user; or typical routes, patterns and times; and
the information associated with the recipient of the message comprises at least one of a contact contained in a contact data structure accessible by the communication device; a linked party in a social network; or a past recipient of a previous message having similar content transmitted from the communication device.

7. The method of claim 6, wherein triggering the biometric capturing component comprises cross-verifying keywords for at least one of the location, the weather condition, monetary value, or the physical activity.

8. The method of claim 1, further comprising selecting the biometric capturing component based on contextual data by:
determining, from at least one of historical data or recipient data, which biometric input is verifiable by a recipient of the message;
selecting a corresponding biometric capturing component based on the determining of the biometric input that is verifiable by the recipient;
including a biometric input that is verifiable by the recipient within a message packet generated for the message; and
transmitting the message with the biometric input included therein for verification at a recipient device, wherein the message is transmitted as a biometrically certified message.

9. The method of claim 1, further comprising:
generating and issuing a prompt requesting the biometric input at the biometric capturing component;
establishing a response time for receipt of the biometric input; and
timing out a message sending function in response to not receiving an authenticated biometric input within the established response time.

10. The method of claim 1, further comprising:
in response to the biometric capturing component being selected to be a camera of the communication device:
capturing an image of a user of the communication device;
performing facial recognition of a captured image; and
authenticating the user in response to the facial recognition identifying a match with a pre-identified image of the user.

11. The method of claim 1, further comprising:
assigning a specific message security level to each biometric capturing component;
determining a message security level of the message associated with at least one of (a) the content of the message or (b) a context associated with the communication device;
comparing the message security level determined for the message with the specific message security level assigned respectively to each biometric capturing component; and
selecting at least one biometric capturing component based upon the message security level and a current context of the communication device.

12. The method of claim 11, wherein:
assigning a specific message security level to each biometric capturing component comprises establishing a high message security level threshold that triggers authentication via a combination of at least two biometric capturing components; and in response to the message security level exceeding the high message security level threshold, the method further comprises:

selecting the combination of at least two biometric capturing components based upon the message security level;

generating and issuing a first prompt requesting a first biometric input at a first selected biometric capturing component of the combination of at least two biometric capturing components;

in response to receiving and authenticating the first biometric input, generating and issuing a second prompt requesting a second biometric input at another selected biometric capturing component of the combination of at least two biometric capturing components; and approving transmission of the message in response to the second biometric input also being received and authenticated.

13. The method of claim 1, wherein transmitting the message comprises:

forwarding the biometric input to a clearinghouse service that performs an association of the received biometric input to authoritative information associated with the user and provides an authentication in response to the association being successful;

receiving authentication of the user from the clearinghouse service; and transmitting the message in response to receiving the authentication.

14. The method of claim 1, further comprising:
selecting a scanner of the communication device;
triggering the scanner to capture the biometric input comprising a pattern from the user's body;
receiving an authentication confirmation code from one of the communication device or the scanner that is based on the pattern;
forwarding the biometric input comprising the authentication confirmation code to a clearinghouse service that performs an association of the received biometric input to authoritative information associated with the user and provides an authentication in response to the association being successful;
receiving authentication of the user from the clearinghouse service; and
transmitting the message in response to receiving the authentication.

15. The method of claim 1, wherein the message is transmitted by a messaging utility, and wherein the messaging utility and the message certification utility are separate software modules running on the communication device.

16. The method of claim 1, wherein determining to authenticate the biometric input from the user of the communication device based on the content of the message comprises identifying a content-related trigger based on a keyword search of the content of the message for specific content.

17. The method of claim 1, wherein triggering the biometric capturing component to capture the biometric input is performed using an always-on voice or always-on camera capability to capture the biometric input without prompting a specific user response.

18. The method of claim 1, wherein authentication of the biometric input as belonging to the authorized user of the communication device is performed on the communication device.

19. The method of claim 1, wherein authentication of the biometric input as belonging to the authorized user of the communication device is performed remotely from the communication device.

20. A communication device, comprising:
a communication mechanism that enables communicating with a network;
at least one biometric capturing component;
at least one processor that is communicatively coupled to the communication mechanism and to the at least one biometric capturing component;
a messaging utility that executes on the at least one processor and configures the communication device to receive content of a message provided for transmission from the communication device; and
a message certification utility that executes on the at least one processor and configures the communication device to:
determine, based on the content of the message provided for transmission from the communication device, to authenticate a biometric input from a user of the communication device before allowing transmission of the message, wherein determining to authenticate the biometric input from the user of the communication device based on the content of the message comprises identifying a content-related trigger associated with a request to send money;
in response to determining to authenticate the biometric input from the user of the communication device based on the content of the message, trigger a biometric capturing component of the at least one biometric capturing component to capture the biometric input from the user of the communication device; and
allow the messaging utility to transmit the message when the biometric input is authenticated as belonging to an authorized user of the communication device.

21. The communication device of claim 20, wherein the message certification utility further configures the communication device to:
identify a credibility compromising factor associated with at least one of (a) the content of the message or (b) a context associated with the communication device;
determine that the message requires user authentication based on the identified credibility compromising factor; and
determine that the message requires biometric user authentication based on a value of the credibility compromising factor being at least a threshold value.

22. The communication device of claim 21, wherein the credibility compromising factor comprises at least one of: (i) a monetary value included within the content of the message exceeding a pre-set threshold; (ii) a location that is pre-established as unexpected; (iii) a location that is unexpected based upon historical data for the pre-established authorized user; or (iv) a location that is unexpected based upon scheduling data for the pre-established authorized user.

23. The communication device of claim 20, wherein the message certification utility configures the communication device to select the biometric capturing component based on contextual data by further configuring the communication device to determine that at least one ambient condition indicates that a particular biometrical capturing device is ineffective, wherein the at least one ambient condition comprises at least one of: (i) moisture; (ii) an ambient illumination; (iii) an obstructed sensor; (iv) an activity associated with motion of the communication device; (v) a barometric pressure; or (vi) ambient noise.

24. The communication device of claim 20, wherein the message certification utility further configures the communication device to determine that the message requires user authentication based on at least one of: a context associated with the communication device, historical data corresponding to a user associated with the communication device, or information associated with a recipient of the message.

25. The communication device of claim 20, wherein the message certification utility configures the communication device to:
- determine, from at least one of historical data or recipient data, which biometric input is verifiable by a recipient of the message;
- select a corresponding biometric capturing component based on the determining of the biometric input that is verifiable by the recipient;
- include a biometric input that is verifiable by the recipient within a message packet generated for the message; and
- transmit the message with the biometric input included therein for verification at a recipient device, wherein the message is transmitted as a biometrically certified message.

26. The communication device of claim 20, wherein the message certification utility further configures the communication device to:
- generate and issue a prompt requesting the biometric input at the biometric capturing component;
- establish a response time for receipt of the biometric input; and
- time out a message sending function in response to not receiving an authenticated biometric input within the established response time.

27. The communication device of claim 20, wherein the message certification utility further configures the communication device to:
- in response to the biometric capturing component being selected to be a camera of the communication device:
- capture an image of a user of the communication device;
- perform facial recognition of a captured image; and
- authenticate the user in response to the facial recognition identifying a match with a pre-identified image of the user.

28. A method for user authentication of a message being transmitted from a communication device, the method comprising:
- receiving content of a message provided for transmission from the communication device;
- determining, by a message certification utility and based on the content of the message provided for transmission from the communication device, to authenticate a biometric input from a user of the communication device before allowing transmission of the message;
- in response to the message certification utility determining to authenticate the biometric input from the user of the communication device based on the content of the message, triggering a biometric capturing component to capture the biometric input from the user of the communication device, wherein triggering the biometric capturing component to capture the biometric input is performed using an always-on voice or always-on camera capability to capture the biometric input without prompting a specific user response; and
- transmitting the message when the biometric input is authenticated by the message certification utility as belonging to an authorized user of the communication device.

* * * * *